United States Patent
Karlsson et al.

(10) Patent No.: US 12,026,741 B2
(45) Date of Patent: *Jul. 2, 2024

(54) SYSTEMS AND METHODS FOR CONTROL OF EVENT RATES FOR SEGMENTED ONLINE CAMPAIGNS

(71) Applicant: Yahoo Ad Tech LLC, New York, NY (US)

(72) Inventors: Niklas Karlsson, Mountain View, CA (US); Qian Sang, Herndon, VA (US); Jiaxing Guo, Sunnyvale, CA (US)

(73) Assignee: Yahoo Ad Tech LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/138,085

(22) Filed: Apr. 23, 2023

(65) Prior Publication Data

US 2023/0259969 A1 Aug. 17, 2023

Related U.S. Application Data

(63) Continuation of application No. 15/369,556, filed on Dec. 5, 2016, now Pat. No. 11,636,508.

(51) Int. Cl.
  *G06Q 30/0242* (2023.01)
  *G06Q 30/0241* (2023.01)
  *G06Q 30/0273* (2023.01)

(52) U.S. Cl.
  CPC ..... *G06Q 30/0244* (2013.01); *G06Q 30/0275* (2013.01); *G06Q 30/0277* (2013.01)

(58) Field of Classification Search
  CPC ........... G06Q 30/0244; G06Q 30/0275; G06Q 30/0207–30/0277
  See application file for complete search history.

(56) References Cited

U.S. PATENT DOCUMENTS

2003/0171990 A1* 9/2003 Rao ............... G06Q 30/0272
  705/14.54
2004/0088241 A1* 5/2004 Rebane ............ G06Q 40/04
  705/37

(Continued)

FOREIGN PATENT DOCUMENTS

JP       5595556 B1 *  9/2014   ......... G06Q 30/0243
WO  WO-2015199710 A1 * 12/2015   ......... G06Q 30/0201

OTHER PUBLICATIONS

Kuang-Chih Lee, Ali Jalali, and Ali Dasdan. 2013. Real time bid optimization with smooth budget delivery in online advertising. In Proceedings of the Seventh International Workshop on Data Mining for Online Advertising (ADKDD '13). Association for Computing Machinery, New York, NY, USA, Article 1, 1-9. https://doi.org/10.1145/2501040.2501979 (Year: 2013).*

(Continued)

*Primary Examiner* — Meredith A Long
*Assistant Examiner* — Scott Snider
(74) *Attorney, Agent, or Firm* — Cooper Legal Group LLC

(57) ABSTRACT

Allocating bids for providing content within a segmented campaign is controlled to ensure that an event rate associated with the provided content meets or exceeds a threshold rate. A campaign-level event rate, associated with the provided content, is estimated and provided as a feedback signal. This feedback signal is employed to dynamically update bid allocations for each of the segments, which in turn varies the number or rate of provided impressions and events. Such feedback enables the control of the campaign-level rate and ensures that the campaign-level rate meets or exceeds the rate threshold. To control these rates, the number of total impressions, as well as the number of associated events, is temporally sampled across the campaign segments. Based on the number of impressions and events, the (Continued)

campaign-level event rate is estimated and employed as the feedback signal. Updating the bid allocations may be based on the Beta Distribution.

20 Claims, 18 Drawing Sheets

(56) References Cited

U.S. PATENT DOCUMENTS

| | | | |
|---|---|---|---|
| 2011/0196733 A1* | 8/2011 | Li | G06Q 30/02 705/14.42 |
| 2014/0122221 A1* | 5/2014 | Jordan | G06Q 30/02 705/14.43 |
| 2018/0108049 A1* | 4/2018 | Kitts | G06Q 30/0272 |

OTHER PUBLICATIONS

N. Karlsson and J. Zhang, "Applications of feedback control in online advertising," 2013 American Control Conference, Washington, DC, USA, 2013, pp. 6008-6013, doi: 10.1109/ACC.2013.6580779. (Year: 2013).*

* cited by examiner $a_i = g(\hat{p}_i, u) \quad 0 \leq \hat{p}_i \leq 1 \text{ and } 0 \leq u \leq 1$

- $g$ is static
- $0 \leq g(\hat{p}_i, u) \leq 1$ for all $\hat{p}_i, u$
- $g(\hat{p}_i, 0) = 1$ for all $\hat{p}_i$
- $g(\hat{p}_i, 1) = 0$ for $0 \leq \hat{p}_i < 1$
- $g(\hat{p}_i, u)$ is continuous in $\hat{p}_i$ and $u$
- $g(\hat{p}_i, u)$ is decreasing in $u$ for $0 < \hat{p}_i < 1$
- $g(\hat{p}_i, u)$ is increasing in $\hat{p}_i$ for $0 < u < 1$
- $g(\hat{p}_i, u)$ is a computationally inexpensive mapping
- $\hat{p}_i \approx p_i$, where $p_i$ is the true event rate.

1: Configuration parameters: $T_{int}, T_{windup}, b, K_p, u^{min}, u^{max}, \delta$
2: Input signals: $p^{ref}(t_k), \hat{p}(t_k)$
3: Output signals: $u(t_k)$
4: State initialization: $I(t_0) = 0, u(t_0) = u^{min}$
5:
6: Computation:
7:
8: $\quad e(t_k) = p^{ref}(t_k) - \hat{p}(t_k)$
9: $\quad e_p(t_k) = bp^{ref}(t_k) - \hat{p}(t_k)$
10: $\quad P(t_k) = K_p e_p(t_k)$
11: $\quad I_{temp}(t_k) = I(t_{k-1}) + \frac{K_p h}{T_{int}} e(t_k)$
12: $\quad u_{temp}(t_k) = P(t_k) + I_{temp}(t_k)$
13:
14: $\quad$ if $u^{min} \geq u(t_{k-1}) + \delta$ or $u^{max} \leq u(t_{k-1}) - \delta$
15: $\quad\quad u_{low}(t_k) = u^{min}$
16: $\quad\quad u_{high}(t_k) = u^{max}$
17: $\quad$ else
18: $\quad\quad u_{low}(t_k) = \max(u(t_{k-1}) - \delta, u^{min})$
19: $\quad\quad u_{high}(t_k) = \min(u(t_{k-1}) + \delta, u^{max})$
20: $\quad$ end
21:
22: $\quad$ if $u_{temp}(t_k) < u_{low}(t_k)$
23: $\quad\quad u(t_k) = u_{low}(t_k)$
24: $\quad$ elseif $u_{temp}(t_k) > u_{high}(t_k)$
25: $\quad\quad u(t_k) = u_{high}(t_k)$
26: $\quad$ else
27: $\quad\quad u(t_k) = u_{temp}(t_k)$
28: $\quad$ end
29:
30: $\quad I(t_k) = I_{temp}(t_k) + (u(t_k) - u_{temp}(t_k)) h / T_{windup}$

1: Configuration parameters: $c$
2: Input signals: $\hat{p}_i(t_k), u(t_k)$
3: Output signals: $a_i(t_k)$
4:
5: Computation:
6:
7:   for all $i$
8:     $\alpha = cu(t_k)$
9:     $\beta = c(1 - u(t_k))$
10:    $a_i(t_k) = B(\hat{p}_i(t_k)|\alpha, \beta)$
11:   end

1: Configuration parameters: $\lambda, h$
2: Input signals: $n_{tot}(t_k), n_{view}(t_k), n_{meas}(t_k)$
3: Output signals: $\hat{p}(t_k)$
4: State initialization: $n_{tot}^{ma}(t_0) = n_{tot}^0, n_{view}^{ma}(t_0) = n_{view}^0, n_{meas}^{ma}(t_0) = n_{meas}^0$
5:
6: Computation:
7:
8: $\quad n_{tot}^{ma}(t_k) = \lambda^h n_{tot}^{ma}(t_{k-1}) + n_{tot}(t_k)$
9: $\quad n_{view}^{ma}(t_k) = \lambda^h n_{view}^{ma}(t_{k-1}) + n_{view}(t_k)$
10: $\quad n_{meas}^{ma}(t_k) = \lambda^h n_{meas}^{ma}(t_{k-1}) + n_{meas}(t_k)$
11:
12: $\quad$ if *gross-based* in-view rate estimate
13: $\quad\quad \hat{p}(t_k) = \max(\min(n_{view}^{ma}(t_k)/n_{tot}^{ma}(t_k), 1), 0)$
14: $\quad$ else (*measured-based* in-view rate estimate)
15: $\quad\quad \hat{p}(t_k) = \max(\min(n_{view}^{ma}(t_k)/n_{meas}^{ma}(t_k), 1), 0)$
16: $\quad$ endif

Fig. 7B

SYSTEMS AND METHODS FOR CONTROL OF EVENT RATES FOR SEGMENTED ONLINE CAMPAIGNS

RELATED APPLICATION

This application claims priority to and is a continuation of U.S. application Ser. No. 15/369,556, filed on Dec. 5, 2016, entitled "SYSTEMS AND METHODS FOR CONTROL OF EVENT RATES FOR SEGMENTED ONLINE CAMPAIGNS", which is incorporated by reference herein in its entirety.

TECHNICAL FIELD

The present disclosure relates generally to computing. More specifically, and without limitation, the present disclosure relates to systems and methods for adaptive control of event rates for segmented online content.

BACKGROUND

Some online content providers are interested in placing content, e.g., advertisements, on websites to promote products or services. In such a context, the placing of the content can also be referred to as an "impression" of the content. In general, these online content providers pay to provide their content in such a way to maximize the total number of events associated with the content, where an event without loss of generality may be an impression, click, conversion, viewable impression, etc. Increasingly, content providers are interested in also controlling the rates of events resulting from impressions served to the users, for example, the average number of clicks per served impression (also called click-through rate) or the average number of viewable impressions per served impression (also called in-view rate).

BRIEF DESCRIPTION OF THE DRAWINGS

FIG. 3B shows various sound properties of a continuous mapping between a control signal, segment-level rate-estimate signals, and bid allocation signals.

FIG. 5B depicts illustrative pseudo-code that can be utilized for updating a control signal, in accordance with various embodiments of the present disclosure.

FIG. 6B depicts illustrative pseudo-code that can be utilized for updating bid allocation signals, in accordance with various embodiments of the present disclosure.

FIG. 7B depicts illustrative pseudo-code that can be utilized for updating rate-estimate signals, in accordance with various embodiments of the present disclosure.

DETAILED DESCRIPTION OF THE EMBODIMENTS

Figure 1:
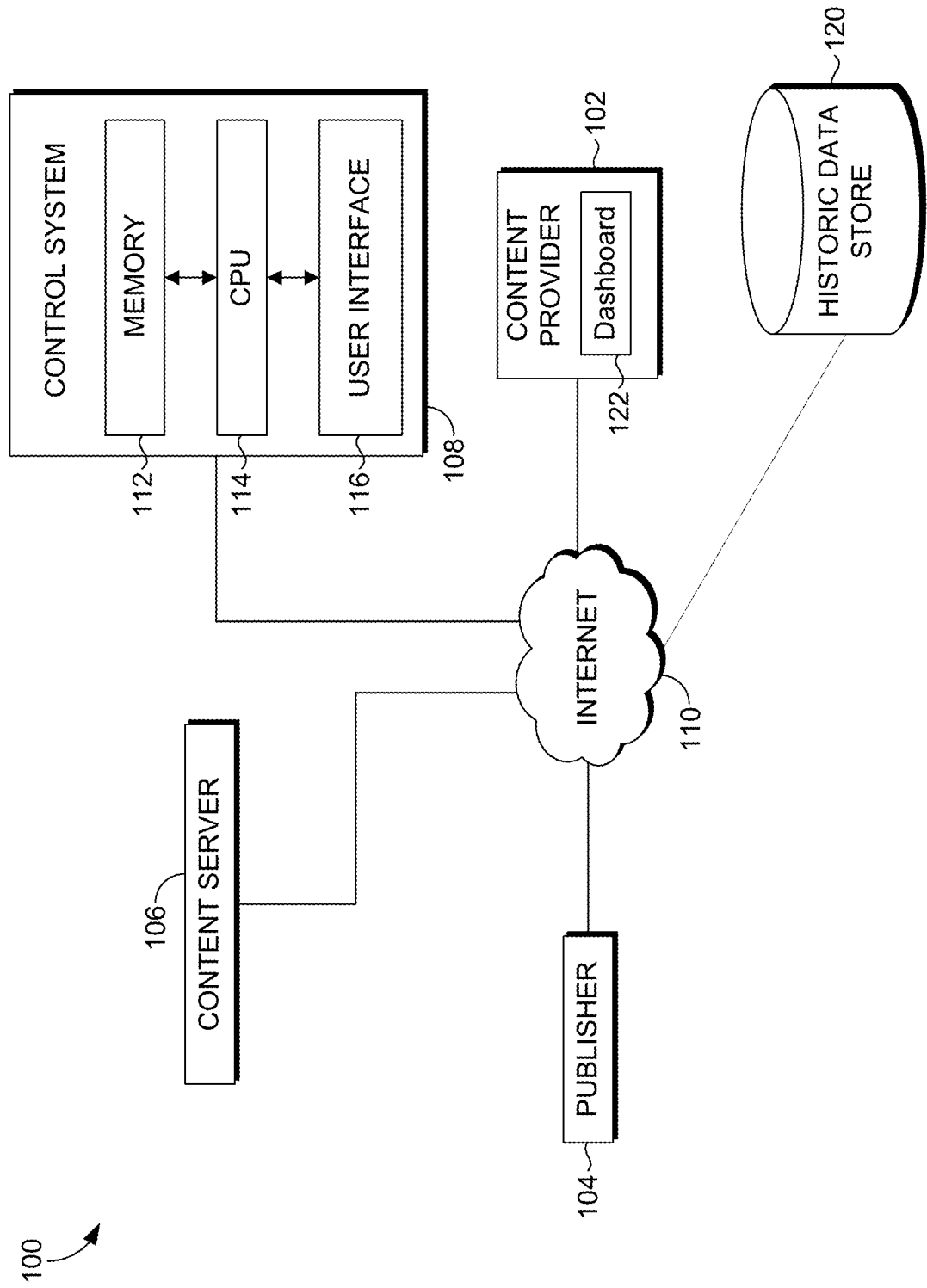
FIG. 1 depicts an illustrative content delivery system, in accordance with embodiments of the present disclosure.

As used herein, the term "impression" may refer to an instance of providing or delivering of content within an online campaign. Such content may include, but is not otherwise limited to advertisements or advertising content. As used herein, the term "event" generally refers to an impression that meets one or more criteria, e.g., an in-view event (or impression), an in-target event (or impression), conversion event (or impression), click event (or impression), completed video event (or impression), and the like. A content provider may define virtually any criteria to constrain the definition of events.

The term "event type" may refer to a particular type of event. For instance one event type may be an in-view event, while another event type may be an in-target event. Other event types include, but are not limited to click events (or simply clicks), conversion events (or simply conversions), completed video events, and the like. An in-view event may be an event or impression that satisfies one or more viewability criteria, e.g. an in-view event in association with an online display advertising campaign may be an impression where at least 50% of the pixels of the content are in view for more than one second.

The term "event rate" may refer to the likelihood or probability that a particular impression is, or will become, an event of an event type of interest, or simply an event of interest. For instance, in one embodiment where in-view events are of interest, 100 impressions are provided to 100 separate users. Furthermore, 73 of the 100 provided impressions are determined to be in-view events, and the in-view event rate is determined or estimated as 0.73. Briefly, the in-view event rate is estimated as 0.73 because the average likelihood or probability for each of the 100 impressions to be an in-view event is 0.73. Thus, an event rate-estimate may be determined as a moving average of the inverse of the ratio of the total number of impressions provided in a time-interval to the number of the impressions that are, or become, an event of interest. In at least one embodiment as discussed below, the event rate-estimate may be based on a sampled number of impressions and a sampled number of events of interest.

Various event rate types may be defined, such as but not limited to in-view rates, in-target rates, click-through rates, conversion rates, completed video event rates, and the like. In some embodiments, the term event rate may refer to an overall event rate. In other embodiments, the term event rate may refer to a generalized event rate. In still other embodiments, the term event rate may refer to an event rate type. As used throughout, event rates may be referred to simply as rates.

An online campaign may be segmented into a plurality of campaign segments, or simply segments. In some embodiments, at least one of the plurality of campaign segments includes a plurality of targeted users, such as but not limited to a user group, target audience, or the like. In at least one embodiment, at least one of the plurality of campaign segments includes only a single targeted user.

The term "campaign-level event rate" may refer to an event rate for an online campaign. In contrast, the term "segment-level event rate" may refer to an event rate for one or more segments of the online campaign. In at least one embodiment, a campaign-level event rate is an estimate of the event rate for the entire, or whole, campaign based on a number of sampled impressions and a number of sampled events of interest, for the campaign. Here, the number of sampled impressions and the number of sampled events are the sum of the impressions and events, respectively, across each of the segments associated with the campaign. In contrast, the segment-level event rate may be an event rate estimate based on the numbers of sampled impressions and events at the segment level. For example, an event rate for Segment_A of a campaign is estimated based on the number of sampled impressions and the number of events of interest associated with Segment_A only.

As used herein, the term "bid allocation" may refer to the probability that a campaign participates in the auction for an impression. Thus, a bid allocation may refer to the percentage of auctions that a content provider, or another party, would like to participate to "win" impressions for a particular segment in an online campaign. A bid may include both a bid allocation and a bid price. For instance, for a particular bid, if the bid allocation is 1, then the campaign bids for all impressions. If the campaign's bid price is greater than all other provided bid prices, the campaign will win each bid impressions. If the bid allocation is 0.1, the campaign participates in 10% of the auctions. Depending on whether the bid price is high enough, as compared to other bid prices, the campaign may or may not win those 10% of the impressions.

As used herein, the term "plant" refers to an object to be controlled, and the term "plant response curve" may refer to a description of the relationship between a control signal applied to the plant and its response. For instance, in various embodiments, the plant response curve refers to the function or relationship between a control signal (u) and an event rate (p). Thus, in functional notation referred to in the various embodiments, the function p(u) may be a plant or at least refer to a plant response curve. The gain of a control system, or a plant, may refer to the derivative of the plant, e.g. gain(u)=dp(u)/du.

Various embodiments are directed towards controlling the event rates for content delivered and/or provided within a segmented online campaign. When deciding whether to provide content in an online campaign, content providers may attempt to allocate a finite budget to provide their content in such a way as to maximize the total number of events. Such maximized events may include various event types, such as but not limited to clicks, conversions, viewable impressions, in-target impressions, completed-video impressions, and the like. Increasingly, however, content providers are also interested in ensuring that when the budget is allocated to provide content, the rates for various event types are controlled. Content providers may be interested in controlling average event rates. Some content providers may be interested in controlling an overall or generalized event rate, while other content providers are interested in controlling a rate for one or more specific event types. Still other content providers may be interested in controlling an event rate for a weighted blend of event types.

Accordingly, content providers may wish to allocate their budget such that an event rate is greater than or equal to a minimum event rate, e.g. a rate threshold. In the past, content providers may have manually blocked segments with low event rates. Other content providers have applied binary threshold mechanisms when allocating bids for providing content. That is to say, an actuation threshold value was applied to each segment of a campaign. If the event rate of a segment is less than the actuation threshold, no part of the budget was allocated to the segment. If the event rate of the segment is greater than the threshold value, then the budget was allocated for the segment. Employing an allocation threshold in various automated and/or control systems may result in poor control performance, at least because a binary threshold approach is difficult to stabilize. For instance, such allocation threshold approaches are sensitive to system perturbations. Furthermore, because a fixed-point solution to an event rate control problem may not exist, it may be difficult or impossible to control the event rate, even in the absence of system perturbations. Thus, such systems may be sensitive to fluctuations in time-dependent signals and parameters employed by the systems.

Such sensitivities result in volatile, unstable, or inadequately controlled event rates, which is not desirable for an effective online campaign. Rather, the responsiveness of such allocation threshold approaches are often too great, small, fast, or slow to achieve the mission objectives of an online campaign. The amplitude and responsiveness of the event-rate oscillations associated with a threshold allocation may be too great or too small to achieve desirable results. For instance, threshold allocation mechanisms may result in too much content being provided within a temporal window, missed opportunities to provide valuable content, or volatile event rates, even if the allocation of the budget is adequate. Furthermore, a relatively stable rate near the rate threshold may not be achievable via threshold actuation. Additionally, such approaches require manual tuning and/or optimization, which require significant human intervention.

The embodiments disclosed herein ensure that a campaign-level event rate for content meets or exceeds a minimum event rate. That is to say, an event rate (associated with content that satisfies one or more criteria to be considered as events) for a campaign is greater than or equal to an event-rate threshold (or simply a rate threshold). Throughout, such event rates may be referred to as campaign-level event rates.

Systems and methods are disclosed that adaptively allocate bids for providing the online content within each of the campaign segments. The campaign-level rate is estimated and provided as a real-time feedback signal. This feedback signal is employed to dynamically update the bid allocations for the segments, which in turn varies or updates the campaign-level event rate. Thus, such feedback enables the control of the campaign-level event rate and ensures that the campaign-level event rate meets or exceeds the rate threshold.

To control event rates, the number of total impressions, as well as the number of events, of delivered online content is temporally sampled across the campaign segments. Based on the volume of sampled impressions, the campaign-level and the segment-level event rates are estimated. At least a portion of these event rate estimates are employed as feedback, to update a control signal that dynamically adapts bid allocations for each of the segments. More specifically, the control signal is updated such that the estimated campaign-level event rate is greater than or equal to the rate threshold.

Figure 3A:
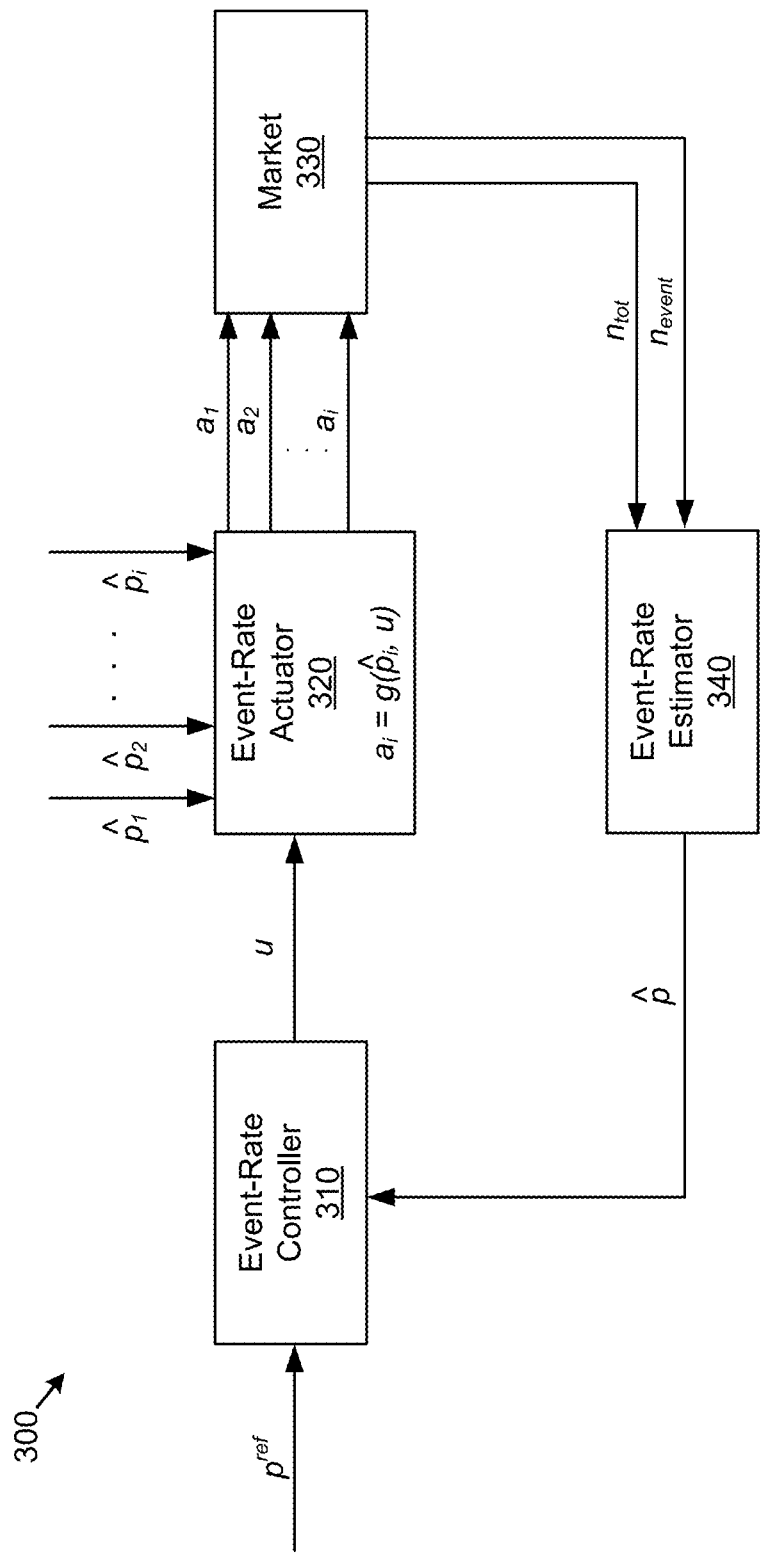
FIG. 3A depicts a block diagram of a portion of an illustrative control system 300, for controlling a campaign-level event rate for a segmented online campaign, in accordance with various embodiments of the present disclosure.

Systems that employ feedback (or feedback-based control systems), such as control systems 108, 300, and of FIGS. 1, and 3A respectively, as well as various methods, such as but not limited to methods 400, 500, 600, and 700 of FIGS. 4, 5A, 6A, and 7A respectively, enable a content provider to specify a minimum event rate (the rate threshold). For instance, the content provider may base the rate threshold on the budget for an online campaign. The various embodiments automatically allocate bids for providing content in such a way to meet or exceed the rate threshold. Furthermore, based on the feedback, the various embodiments further enhance the effectiveness of controlling the various event rates of the campaign by selectively determining which campaign segments to allocate bids to, without an over-emphasis on segments with a greater segment-level event rate or an under-emphasis on segments with a lesser segment-level event rate.

In the various embodiments presented herein, a control system is employed to smoothly control the allocation of bids, resulting in smoothly controlled event rates. As noted above, the smoothly controlled event rates are estimated and provided, via a feedback loop, to an event-rate controller of the control system. The event-rate controller updates a control signal based on the feedback loop. The updated control signal is provided to an actuator of the control system. The actuator updates a bid allocation for each of the segments, based on at least the control signal. The bid allocations for the segments are employed to generate bids to provide content in the various segments.

Rather than applying a threshold condition to the control signal, the actuator employs a continuous function, or map, to update the bid allocations for the segments based on a control signal. In an exemplary but non-limiting embodiment, the continuous function may be associated with the beta distribution, often applied in probability theory. However, it should be noted that, even though a statistical distribution may be employed to generate a relationship between a control signal and an allocation signal, the various embodiments do not include a stochastic nature. Rather, the various embodiments provide the smooth, predictable, and responsive control of event rates for a segmented online campaign. Furthermore, the control signal may intuitively be interpreted as a "soft" or "fuzzy" threshold value for the in-view rate.

Reference will now be made in detail to illustrative embodiments of the invention, examples of which are illustrated in the accompanying drawings. Wherever possible, the same reference numbers will be used throughout the drawings to refer to the same or like parts.

Exemplary Operating Environments

FIG. 1 depicts an illustrative content delivery system 100, in accordance with embodiments of the present disclosure. As shown in FIG. 1, content delivery system 100 may include one or more content providers 102, publishers 104, content servers 106, and control systems 108 that are in communication with one another through a network, such as the Internet 110. The number and orientation of the computing components in FIG. 1 is provided for purposes of illustration only. Any other number and orientation of components is possible. For example, one or more content providers 102, publishers 104, content servers 106, control systems 108, and historic data stores 120 may be combined or co-located and/or communicate directly with one another, instead of over Internet 110. The components of FIG. 1 may include any type or configuration of computers and/or servers, such as, for example, a server cluster, a server farm, load balancing servers, distributed servers, etc. In addition, each component may include one or more processors, memories or other data storage devices (i.e., computer-readable storage media), such as hard drives, NOR or NAND flash memory devices, or Read Only Memory (ROM) devices, etc., communications devices, and/or other types of computing elements.

Content providers 102 represent computing components associated with entities having online content that the entities desire to deliver to online users. In some embodiments, the content with which the content providers 102 are associated includes targeted content. Targeted content can include, for example, marketing content (e.g., banner content, pop-up content, etc.). Content providers 102 may interact with publishers 104, content servers 106, and/or control systems 108 through the Internet 110. Thus, content provider 102 may be able to communicate content delivery information, such as content information, targeting information, user information, budget information, bidding information, etc., to other entities in content delivery system 100. Dashboard 122 can be configured to present information concerning content delivery system 100 and, in particular, existing or potential content delivery campaigns, also referred to herein as segment groups or tract groups, and associated campaign segments or tracts that define a target audience for the segments of the campaign. For instance, the campaign may include a plurality of campaign segments or tracts, each associated with a target audience. Such information that dashboard 122 may present can include, for example, current real-time event rates, such as but not limited to campaign-level and segment-level event rates, rate thresholds, bid allocations for the segments, control signal values, and the like.

In addition to presenting information, dashboard 122 may enable a user to provide information, data, signals, configuration parameters, or the like. For instance, a user may provide and/or update a rate threshold via dashboard 122. A user may additionally provide and/or update configuration parameters, such as but not limited to controller configuration parameters, actuator configuration parameters, rate-estimator configuration parameters, and the like.

Publishers 104 represent computing components associated with entities having inventories of available online content space. For example, publishers 104 may include computing components associated with online media providers, search engines, e-mail programs, web-based applications, web pages, or any computing component or program having online user traffic. Publishers 104 may interact with content providers 102, content servers 106, and/or controllers 108 via the Internet 110. Thus, publishers 104 may be able to communicate inventory information, such as site information, demographic information, cost information, etc., to other computing components in system 100.

Content servers 106 may include servers or clusters of servers configured to process content delivery information from content provider 102 and/or inventory information from publishers 104, either directly or indirectly. In certain embodiments, content servers 106 may be remote web servers that receive content information from content provider 102 and serve content to be placed by publishers 104 on websites maintained, controlled, or owned by publishers 104. Content servers 106 may be configured to serve content across various domains of publishers 104, for example, based on content delivery information provided by content providers 102. Content servers 106 may also be configured to serve content based on contextual targeting of web sites, search results, and/or user profile information, all of which can be utilized in determining one or more segments defining the target audience for the content. In some embodiments, content servers 106 may be configured to serve content based on one or more signals generated by control systems 108.

Historic data store 120 can include historic information concerning each impression that is delivered within content delivery system 100, including: a price at which each impression was delivered, such a price may correspond with the clearing price of each impression; additional circumstances that the impression leads to (e.g., click, conversion, view, etc.); and user information for the impression (e.g., website, location information, demographic information, etc.).

Control system 108 may include computing systems configured to receive information from computing components in system 100, process the information, and generate various outputs (e.g., the control signal discussed herein) to be sent to other computing components in system 100, according to the illustrative methods described herein. Various embodiments of control systems are described throughout. However, briefly, here control system 108 enables a content provider to specify a minimum event rate (the rate threshold). Control system 108 automatically allocates bids for providing content in such a way to meet or exceed the rate threshold, thus enhancing the effectiveness of controlling various event rates for the online campaign. Furthermore, based on the feedback, control system 108 further enhances the effectiveness of controlling the event rates for the campaign by selectively determining which campaign segments to allocate bids to, without an over-emphasis on segments with a greater segment-level event rate or an under-emphasis on segments with a lesser segment-level event rate.

Control systems 108 may include any type or combination of computing systems, such as clustered computing machines and/or servers, including virtual computing machines and/or virtual servers. Control systems 108 may include, for example, implementations of AdLearn Open Platforms (AOP) control systems offered by America Online (AOL) of New York, New York. In some embodiments, control systems 108 may include an assembly of hardware, including a memory 112, a central processing unit ("CPU") 114, and/or a user interface 116. Memory 112 may include any type of RAM or ROM embodied in a physical, computer-readable storage medium, such as magnetic storage including floppy disk, hard disk, or magnetic tape; semiconductor storage such as solid state disk (SSD) or flash memory; optical disc storage; or magneto-optical disc storage. CPU 114 may include one or more processors for processing data according to instructions stored in the memory, for example to perform the methods and processes discussed in detail herein. The functions of the processor may be provided by a single dedicated processor or by a plurality of processors. Moreover, the processor may include, without limitation, digital signal processor (DSP) hardware, or any other hardware capable of executing software. User interface 116 may include any type or combination of input/output devices, such as a display monitor, graphical user interface, touch-screen or pad, keyboard, and/or mouse. In other embodiments, campaign control systems 108 may include virtual representations of hardware operating, for example, on a virtualization server.

Figure 2:
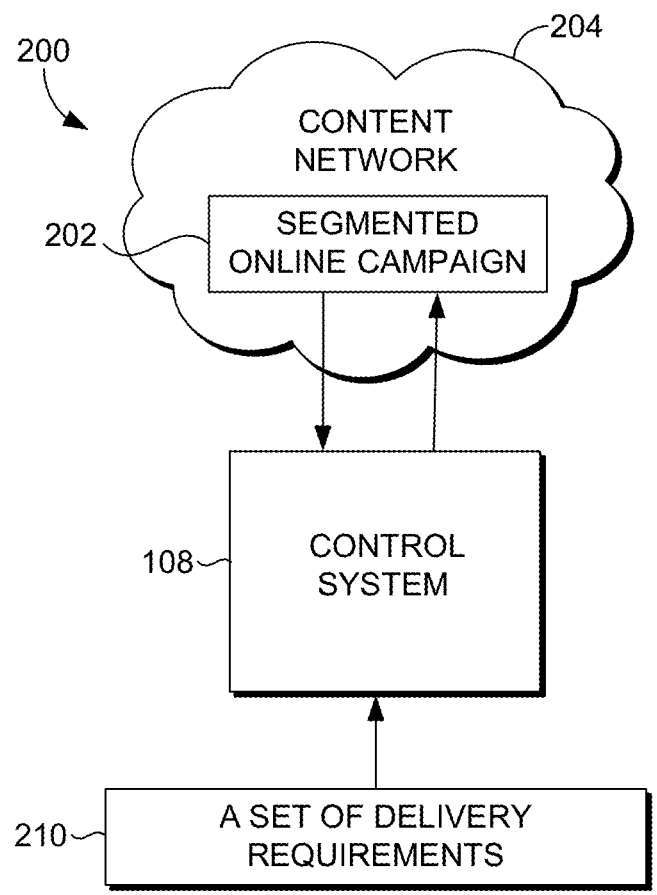
FIG. 2 depicts an illustrative online control system for controlling an event rate for segmented online campaign operating in an online content network, in accordance with various embodiments of the present disclosure.

FIG. 2 depicts an illustrative online content delivery environment 200 for controlling an event rate for segmented online campaign 202 operating in an online content network 204, in accordance with various embodiments of the present disclosure. Although various embodiments discussed herein relate to a segmented online campaign, it should be noted that other embodiments are not so limited. That is to say, a campaign may be an un-segmented campaign.

Content network 204 may include a network or collection of one or more content providers 102, one or more publishers 104, content servers 106, control systems 108, or other components of system 100 of FIG. 1. Elements of content network 204 may operate to receive requests for content (e.g., impression requests) associated with one or more campaign segments of online campaign 202, e.g., from publishers 104 such as websites or other computing components with an inventory of available content space. Content network 204 may also group content requests for various content delivery tactic groups, e.g., according to impressions to be "targeted" based on a combination of attributes defined by the content requests. Content network 204 may also accept bids (e.g., from one or more control systems 108) on the content requests and process the bids to serve content (e.g., targeted content) to the content requests.

Any number or type of online campaign 202 may be operated within content network 204, across various content servers and domains associated with the Internet. As noted, online campaign 202 may be a segmented or an un-segmented campaign. Online content delivery environment 200 may be implemented by one or more of the content providers 102, publishers 104, content servers 106, and/or control systems 108 described in FIG. 1. For example, online content delivery environment 200 may represent the interaction of one or more control systems 108 with other computing components in system 100.

In one embodiment, online content delivery environment 200 may include one or more instances of control system 108. Control system 108 may comprise computers or servers connected to the Internet. For illustrative purposes, control system 108 is illustrated outside content network 204 in FIG. 2. In some embodiments, control system 108 is included in content network 204. In other embodiments, control system 108 is outside of content network 204. Such computers or servers may be configured as described with respect to control system 108, as depicted by FIG. 1, or in any other suitable configuration. Alternatively, control system 108 may be implemented by software modules executed by CPUs 114 of control system 108. Control system 108 may be embodied entirely in hardware, entirely in software, or in any combination of hardware and software implemented across any number of computing devices.

Control system 108 may be provided with a set of delivery requirements 210, which may be adjustable design parameters set by a user. For instance, the set of delivery requirements 210 may include a rate threshold and/or any number of configuration parameters, such as but not limited to controller configuration parameters, actuator configuration parameters, rate-estimator configuration parameters, and the like, as discussed herein. The set of delivery requirements 210 may be implemented by control system 108.

Various embodiments of control system 108 are discussed in conjunction with control systems 300 of FIG. 3A, as well as methods 400, 500, 600, and 700 of FIGS. 4, 5A, 6A, and 7A, respectively. However, briefly here, control system 108 controls the event rate for content delivered to the segments of online campaign 202. In some embodiments, the controlled event rate may be an average event rate (average over a rolling temporal window or a number of sampling periods). For instance, control system 108 ensures that a campaign-level event rate for the delivered content meets or exceeds a minimum event rate, e.g. a rate threshold.

Control system 108 allocates bids for providing the online content within each of the campaign segments of online campaign 202. The campaign-level event rate is estimated and provided as a real-time feedback signal. This feedback signal is employed to dynamically update the bid allocations for the segments, leading to variations of the campaign-level event rate. Thus, such feedback enables control system 108 to control the campaign-level of online campaign 202 and ensures that the campaign-level event rate meets or exceeds the rate threshold.

To control the event rate, control system 108 may temporally sample, across the campaign segments, the number of total impressions, as well as the number of events, of delivered content. Based on the volume of sampled impressions, the campaign-level and the segment-level event rates are estimated. Control system 108 employs at least a portion of these event rates, as feedback to update a control signal that dynamically adapts bid allocations for each of the segments, such that the estimated campaign-level event rate is greater than or equal to the rate threshold.

Event Rate Control Systems

FIG. 3A depicts a block diagram of a portion of an illustrative control system 300, for controlling a campaign-level event rate for a segmented online campaign, in accordance with various embodiments of the present disclosure. Control system 300 may generally be configured to utilize data observed in or sampled from market 330. This data can be utilized to generate feedback signals to control the subsequent bid allocations placed in market 330 to facilitate, for example, providing impressions in such a way that an estimated event rate meets or exceeds the desired minimum event rate (the rate threshold). For instance, control system 300 may be employed as control system 108 in content delivery system 100 of FIG. 1 or in content delivery environment 200 of FIG. 2. Furthermore, control system 300 may implement at least portions of any of methods 400, 500, 600, and 700 of FIGS. 4, 5A, 6A, and 7A respectively.

As noted above, an impression refers to an instance of providing or delivering of content within a campaign. The content may be delivered within at least one segment of a segmented campaign. For instance, an impression may be provided to one or more users of the segment group. As also noted above, an event is an impression that meets one or more criteria. A content provider may employ virtually any criteria. For instance, a content provider may employ criteria such that when a user clicks on the provided content, the impression leads to a click event. Other user-interaction with the provided content may also result in the impression classified as an event. An event rate may be estimated as the ratio of the number of events to the number of impressions. Such estimates of an event rate may be determined based on samples from a market, such as market 330. In various embodiments, the rate threshold is the minimum required campaign-level rate As used herein, a bid allocation, or simply an allocation, is the proportion, fraction, or ratio of content providing opportunities that the content provider chooses to provide a bid for. As discussed below, the online campaign is segmented into m campaign segments, where $m \in \mathbb{N}$. As also discussed below, a bid allocation signal, $a_i$ may be employed for each of m campaign segments, where $a_i \in \mathbb{R}$, $0 \leq a_i \leq 1$, and $i=\{1, 2, 3, \ldots, m\}$. The content provider may provide bids in the market based on the bid allocation signals.

As depicted, system 300 includes an event-rate controller 310, an event-rate actuator 320, a market 330, an event-rate estimator 340, and other components. Each of these components may be communicatively coupled with one another, for example, as depicted in FIG. 3A. This communicative coupling may be, for example, via a bus, network, shared memory, etc., or any combination thereof. Market 330 represents a bidding environment in which content providers place bids for content space that is offered by publishers.

Event-rate controller 310 is configured to take a minimum campaign-level event rate, $p^{ref}$, (hereinafter merely referred to as the rate threshold) and a scalar feedback signal ($\hat{p}$), The campaign-level rate-estimate signal) as inputs. In some embodiments, the rate threshold is a reference or threshold value. In at least one embodiment, the rate threshold is a reference or a threshold signal. As such, a content provider may temporally vary the rate threshold. The rate threshold may be a content provider defined minimum campaign-level event rate for a segmented online campaign.

Event-rate controller 310 is configured to dynamically update a control signal (u), where $u \in \mathbb{R}$ and $0 \leq u \leq 1$. The control signal may be more specifically referred to as an event rate control signal for segment-level allocation control adjustment. The control signal can be updated by event-rate controller 310 based, at least in part, on the rate threshold and the scalar feedback signal $\hat{p}$. The scalar feedback signal may be an estimate for the campaign-level event rate. Event-rate controller 310 may enable or employ at least portions of process 500 of FIG. 5A to update the control signal.

Event-rate actuator 320 is configured to take as input, the updated control signal and segment-level rate-estimate signals for each of the campaign segments ($\hat{p}_1, \hat{p}_2, \hat{p}_3, \ldots \hat{p}_m$) for m campaign segments. In various embodiments, $\hat{p}_i \in \mathbb{R}$ and $0 \leq \hat{p}_i \leq 1$. Thus, $\hat{p}_i$ is the segment-level rate-estimate signal for the i-th campaign segment. Based on the input control signal and the segment-level rate-estimate signals, the event-rate actuator 320 updates a bid allocation signal ($a_i$) for each of the campaign segments. More specifically, the event-rate actuator 320 employs a continuous function or mapping, $a_i = g(\hat{p}_i, u)$, to update each of the allocation signals.

Note the continuity of the mapping for the allocation signals, as contrasted with the previously discussed allocation threshold mechanisms.

As shown in FIG. 3A, the updated allocation signals are provided to market 330 to place bids for the delivery of content in the market 330. As noted above, a bid may include a bid price. Event-rate actuator 320 may enable or employ at least portions of process 600 of FIG. 6A to update the allocation signals for the campaign segments. In various embodiments, event-rate actuator 320 is static. That is to say that event-rate actuator 320 does not require an initialization and/or memory to access previous states. Accordingly, event-actuator 320 may be a stateless actuator. In other embodiments, event-actuator may include a state that requires initialization.

Event-rate estimator 340 is configured to take as input impression and event volumes ($n_{tot}$, $n_{event}$), sampled from the market 330. For example, in the context of in-view rate control, an event refers to an impression being classified as viewable. The event volumes $n_{event}$ may include $n_{view}$, the total number of viewable impressions, and $n_{meas}$, the total number of measured impressions, and $n_{tot}$ denotes the total number of served impressions. Event-rate estimator 340 updates at least the estimate for the campaign-level rate-estimate signal ($\hat{p}$). As shown in FIG. 3A, event-rate estimator 340 provides the estimate for the campaign-level rate-estimate signal, as a scalar feedback signal, to event rate-controller. Event-rate estimator 340 may enable or employ at least portions of process 700 of FIG. 7A to update the estimate for the campaign-level rate-estimate signal. The above discussed components facilitate a content provider in controlling the campaign-level event rate.

Exemplary Embodiments of an Event-Rate Actuator

An event-rate actuator, such as but not limited to event-rate actuator 320 of FIG. 3A, continuously maps control signal (u) to updates to bid allocation signals ($a_i$) for each of the campaign segments in a manner to control the campaign-level rate-estimate signal (p) based on estimates of the segment-level rate-estimate signals ($\hat{p}_i$). More specifically, a continuous function or mapping between each of the control signal, the segment-level rate-estimate signals, and the bid allocation signals, $a_i = g(\hat{p}_i, u)$ is employed. As such, an event-rate actuator may enable, perform, and/or execute at least portions of process 600 of FIG. 6A and/or pseudo-code 620 of FIG. 6B.

In various embodiments, the continuous relationship between the control signal and the campaign-level rate-estimate signal, as well as the continuous relationship between the segment-level rate-estimate signal and the campaign-level rate-estimate signal is mathematically continuous, differentiable, and defined across its entire range and domain. Furthermore, small perturbations in the control signal or any of the segment-level rate-estimate signals result in small and/or continuous perturbations in the campaign-level rate-estimate signal.

Furthermore, the continuous relationship between u and $\hat{p}$, via $a_i = g(\hat{p}_i, u)$ is monotonic, and the range of values for $0 \leq u \leq 1$ continuously map to the widest range of possible values for $\hat{p}$. FIG. 3B shows various sound properties of a continuous mapping between a control signal, segment-level rate-estimate signals, and bid allocation signals. Note that the continuous function $g(\hat{p}_i, u)$ provides the mapping.

In various embodiments, the Beta Distribution may be employed for the continuous mapping between the control signal, the segment-level rate-estimate signals, and the bid allocation signals ($a_i = g(\hat{p}_i, u)$). When the Beta Distribution is employed, the continuous mapping includes all of the properties shown in FIG. 3B.

The Beta Distribution is a continuous distribution, characterized by two shape parameters $\alpha > 0$, $\beta > 0$. The probability density function of the Beta Distribution is $$f(x \mid \alpha, \beta) = \frac{x^{\alpha-1}(1-x)^{\beta-1}}{B(\alpha, \beta)}$$

where $x \in [0,1]$, and $B(\alpha,\beta)$ is the beta function of the Euler integral, defined by $$B(\alpha,\beta) = \int_0^1 x^{\alpha-1}(1-x)^{\beta-1} dx$$

The expected value ($\mu$) and the variance ($\sigma^2$) of the Beta Distribution, as a function of the shape parameters is $$\mu = \frac{\alpha}{\alpha + \beta}$$

$$\sigma^2 = \frac{\alpha\beta}{(\alpha+\beta)^2(\alpha+\beta+1)}$$

The cumulative density function of the Beta Distribution, may be referred to as the regularized incomplete beta function, and is given as $$F(x \mid \alpha, \beta) = \int_0^x f(t \mid \alpha, \beta) dt$$

If $\sigma^2 > 0$, then inverting the above relationships between the shape parameters and the expected value and variance, $$\alpha = \frac{\mu^2(1-\mu)}{\sigma^2} - \mu$$

$$\beta = (1-\mu)\left(\frac{\mu(1-\mu)}{\sigma^2} - 1\right)$$

In some embodiments, the cumulative density function of the Beta Distribution is employed as the continuous mapping between each of the control signal, the segment-level rate-estimate signals, and the bid allocation signals. In such embodiments, the shape parameters are represented as functions of the control signal. Thus, in some embodiment $g(\hat{p}_i, u) = F(\hat{p}_i \mid \alpha(u), \beta(u))$, such that $$a_i = F(\hat{p}_i \mid \alpha(u), \beta(u))$$

More particularly, the expected value and the variance of the Beta Distribution may be represented in terms of the control parameter, and an actuator configuration parameter $c > 0$, $$\mu = u$$

$$\sigma^2 = \frac{1}{c+1}u(1-u)$$

Using the above, the shape parameters may be represented as functions of the control signal and the actuation configuration parameter, which adjusts the sensitivity of the continuous mapping in response to the control parameter and the segment-level rate-estimate signals. Thus in various embodiments, the allocation signal for each campaign segment may be determined as $\alpha_c(u)=cu$ $\beta_c(u)=c(1-u)$ $a_i=F(\hat{p}_i|\alpha_c(u),\beta_c(u))$ if $0<u<1$; otherwise $a_i=u$.

Although the continuous mapping employs a statistical distribution, updating the bid allocation signal is not a stochastic process. Rather, $$a_i(\hat{p}_i, u) = \frac{1}{B(\alpha_c(u), \beta_c(u))} \int_0^{\hat{p}_i} t^{\alpha-1}(1-t)^{\beta-1} dt$$

$$B(\alpha_c(u), \beta_c(u)) = \int_0^1 t^{\alpha_c(c)}(1-t)^{\beta_c(u)} dt$$

where the regularized incomplete beta functions is determined as $$B(\alpha_c(u),\beta_c(u))=\int_0^1 t^{\alpha_c(c)}(1-t)^{\beta_c(u)}dt$$

Figure 8A:
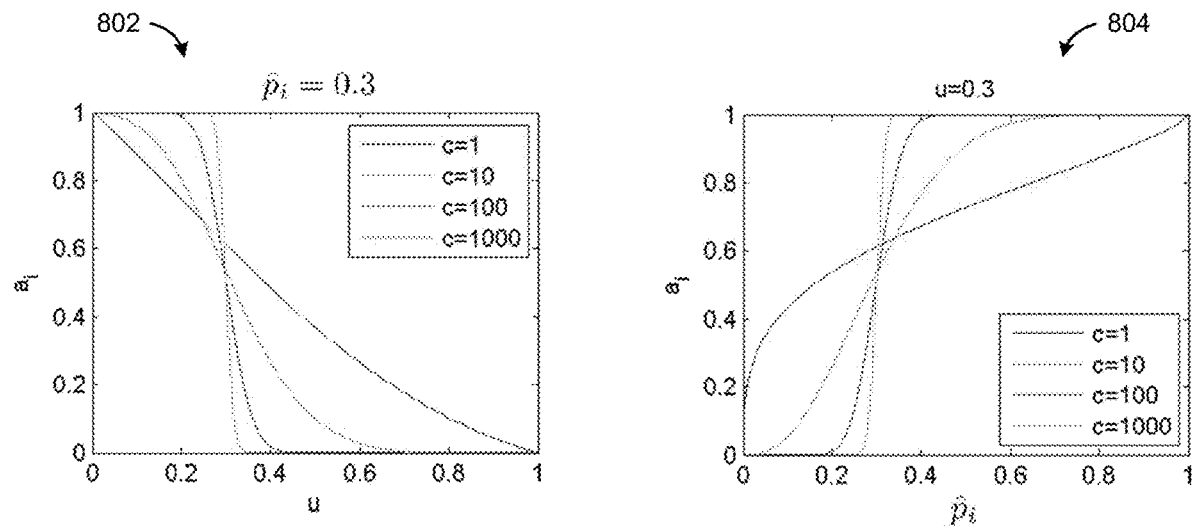
FIG. 8A includes plots that show the relationships between a bid allocation signal, a control signal, and a segment-level rate-estimate signal, for different values of an actuation configuration parameter.

FIG. 8A includes plots that show the relationships between a bid allocation signal, a control signal, and a segment-level rate-estimate signal, for different values of an actuation configuration parameter. Plot 802 shows the continuous relationship between $a_i$ and u for several values of c, i.e. a family of continuous curves for $a_i(u)$, where $\hat{p}_i=0.3$, as an example. Note that $a_i$ is monotonically decreasing in u and a steep drop occurs in $a_i$ at $u \approx p_i$. Plot 804, shows opposite behavior for the continuous relationship between $a_i$ and $\hat{p}_i$ for u=0.3, as an example.

Figure 8B:
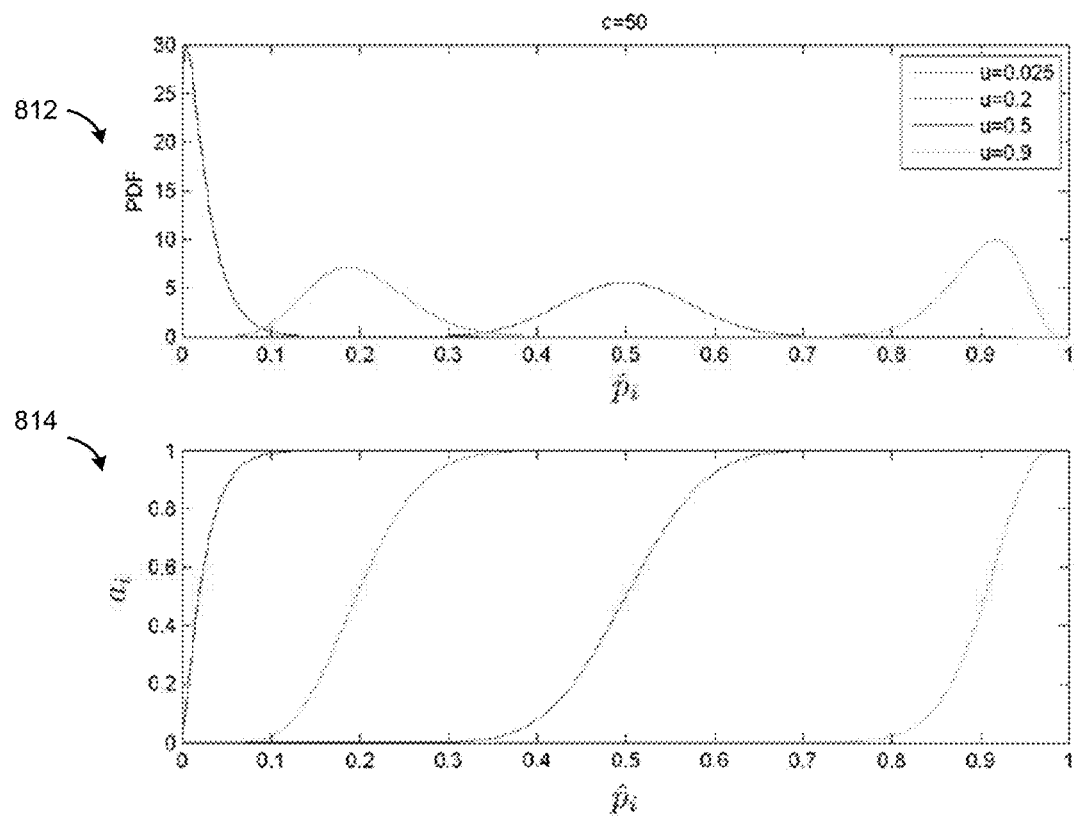
FIG. 8B includes plots that show the relationships between a bid allocation signal and a segment-level rate-estimate signal for various values of the control signal.

FIG. 8B includes plots that show the relationships between a bid allocation signal and a segment-level rate-estimate signal for various values of the control signal. Plot 812 includes a family of curves associated with various values of the control signal that show the probability density function (PDF) of the Beta Distribution, as a function of $\hat{p}_i$. Plot 814 includes analogous curves that show the continuous relationship between $a_i$ and $\hat{p}_i$. In plot 814, note the smooth continuous behavior of $a_i$, which is advantageous in the presence of noise in $\hat{p}_i$, which is typical for online campaigns. Note that for each of the curves of plot 814, the curves, $a_i$ is monotonically increasing as a function of $\hat{p}_i$, and as $\hat{p}_i \to 0$, then $a_i \to 0$ and as $\hat{p}_i \to 1$, then $a_i \to 1$ for all values of u. Furthermore, $a_i$ increases most rapidly where $\hat{p}_i \approx u$.

Figure 8C:
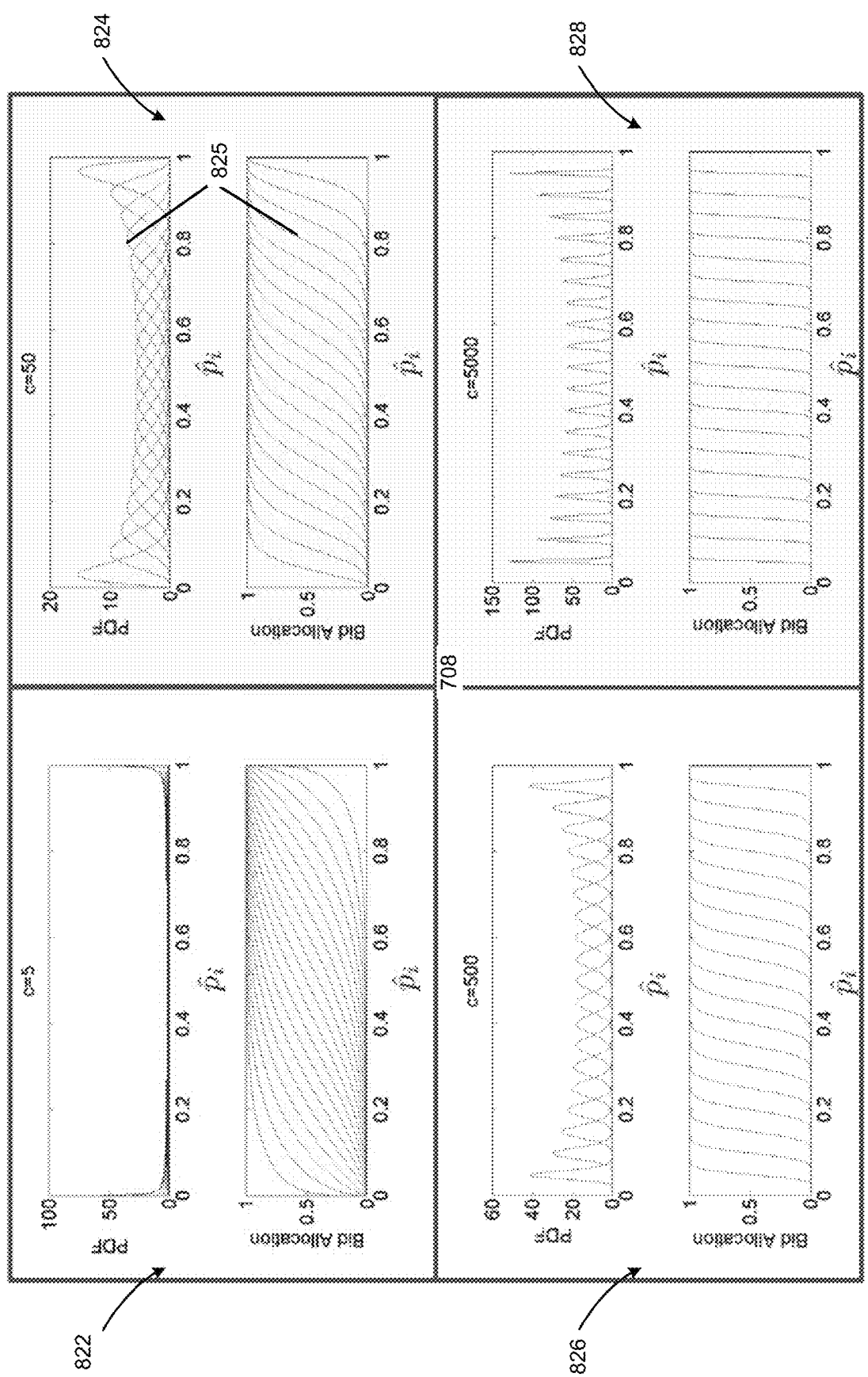
FIG. 8C includes plots that show the relationships between a bid allocation signal and a segment-level rate-estimate signal for various values of the actuator configuration parameter.

FIG. 8C includes plots that show the relationships between a bid allocation signal and a segment-level rate-estimate signal for various values of the actuator configuration parameter. In each pair of plots 822, 824, 826, and 828, the upper plot shows the PDF as a function of $\hat{p}_i$, while the lower plot shows the continuous relationship between $a_i$ and $\hat{p}_i$. Also, for each plot in pairs of plots 822, 824, 826, and 828, a family of curves is shown, where the family of curves corresponds to u={0.0, 0.05, 0.10, 0.15, . . . ,1} from left to right. For the pair of plots 822, c=5. For the pair of plots 824, c=50. For the pair of plots 826, c=500. For pairs of plots 828, c=5000. Notice that the larger the actuator configuration parameter, the bid allocation signal more resembles a threshold approach, while a smaller actuator configuration parameter provides a less extreme response in the bid allocation signal.

For instance, the indicated curve 825 of plots 824 shows the relationship for the bid allocation signal and the segment-level rate-estimate signal, where u=0.75 and c=50. Note that $\hat{p}_i$ is the segment-level rate estimate for the ith segment, where the value of the control signal is 0.75. The shape of curve 825 indicates that segments with larger event rates, will be assigned larger allocations for the segments. Consider an embodiment, where the content provider is attempting to control the event rate at a value of approximately 80%. Segments with rate estimates <<0.8 are assigned virtually no bid allocations. That is to say, the content provider will not participate in the auctions for such segments, because the event rate is too low. Segments where the rate estimates are >0.8 have larger bid allocations. The content provider will participate in many auctions from these segments, because the estimated event rate is higher than 80%. By adjusting, updating, or varying the control signal, the bid allocations are adjusted, updated, or varied for different segments, to achieve 80% event rate at the campaign level.

Figure 8D:
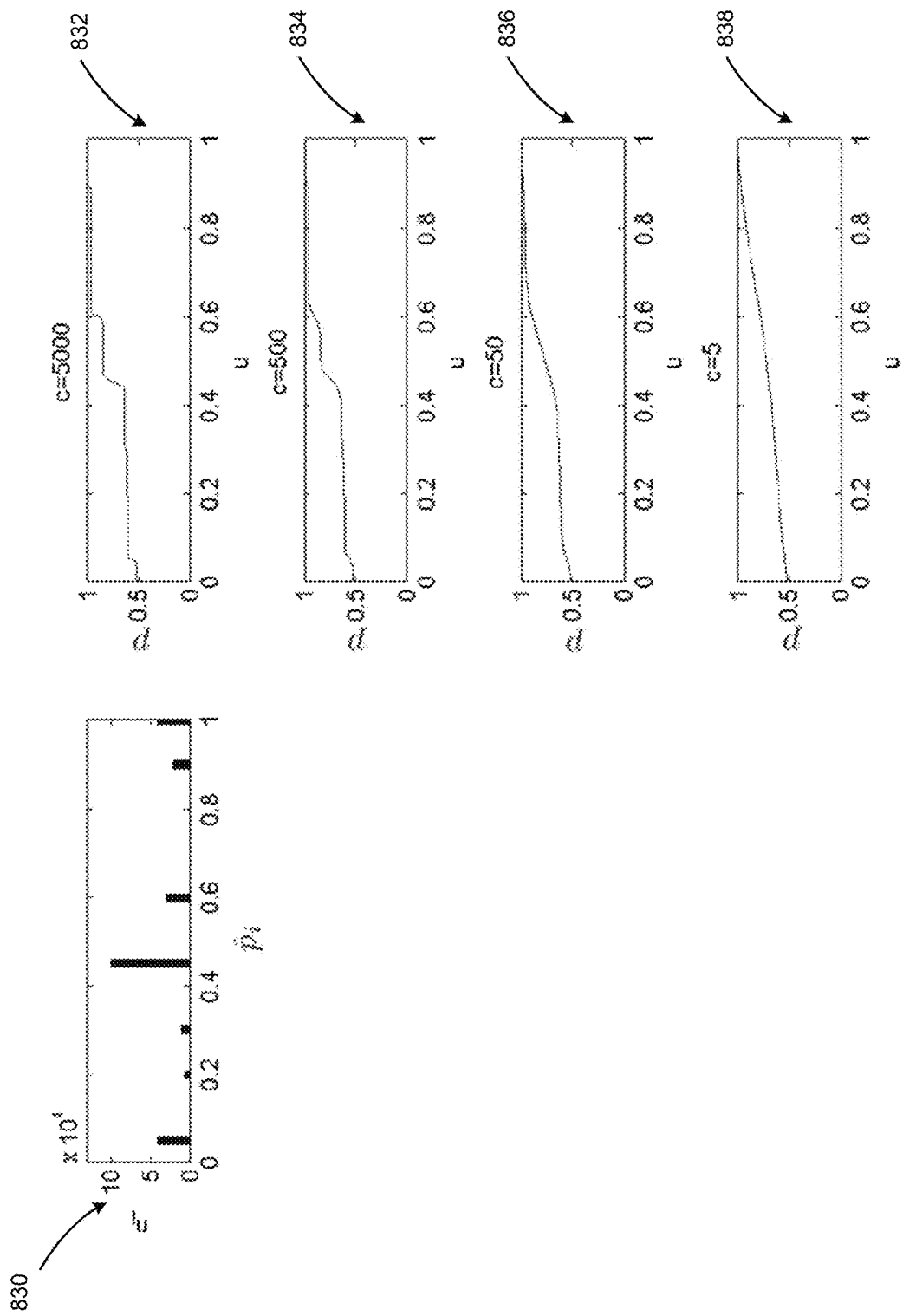
FIG. 8D shows the relationship between a campaign-level event rate as a function of the campaign-level control signal for different values of the actuator configuration parameter for an online campaign.

FIG. 8D shows the relationship between a campaign-level event rate (p) as a function of the campaign-level control signal (u) for different values of the actuator configuration parameter for an online campaign. Histogram 830 shows the distribution of segment-level event rates for all segments of an online campaign, where $n_i$ represents the number of available impressions per segment-level event rate. Plots 832, 834, 836, and 838 show the response curves ($\hat{p}_i(u)$) for c=5000, 500, 50, and 5 respectively. Plot 832 demonstrates that larger actuator configuration parameter results in approximately a staircase response function, while for smaller actuator configuration parameters (plot 838), the response curve is more smooth. The gain of a control system, such as but not limited to control system 300 of FIG. 3A may be defined as gain(u)=dp(u)/du. Thus, the derivative of plots 832, 834, 836, and 838 can be employed to determine the gain of the plant (e.g. the relationship between u and dp(u)/du) for various values of the actuator configuration parameter.

Figure 8E:
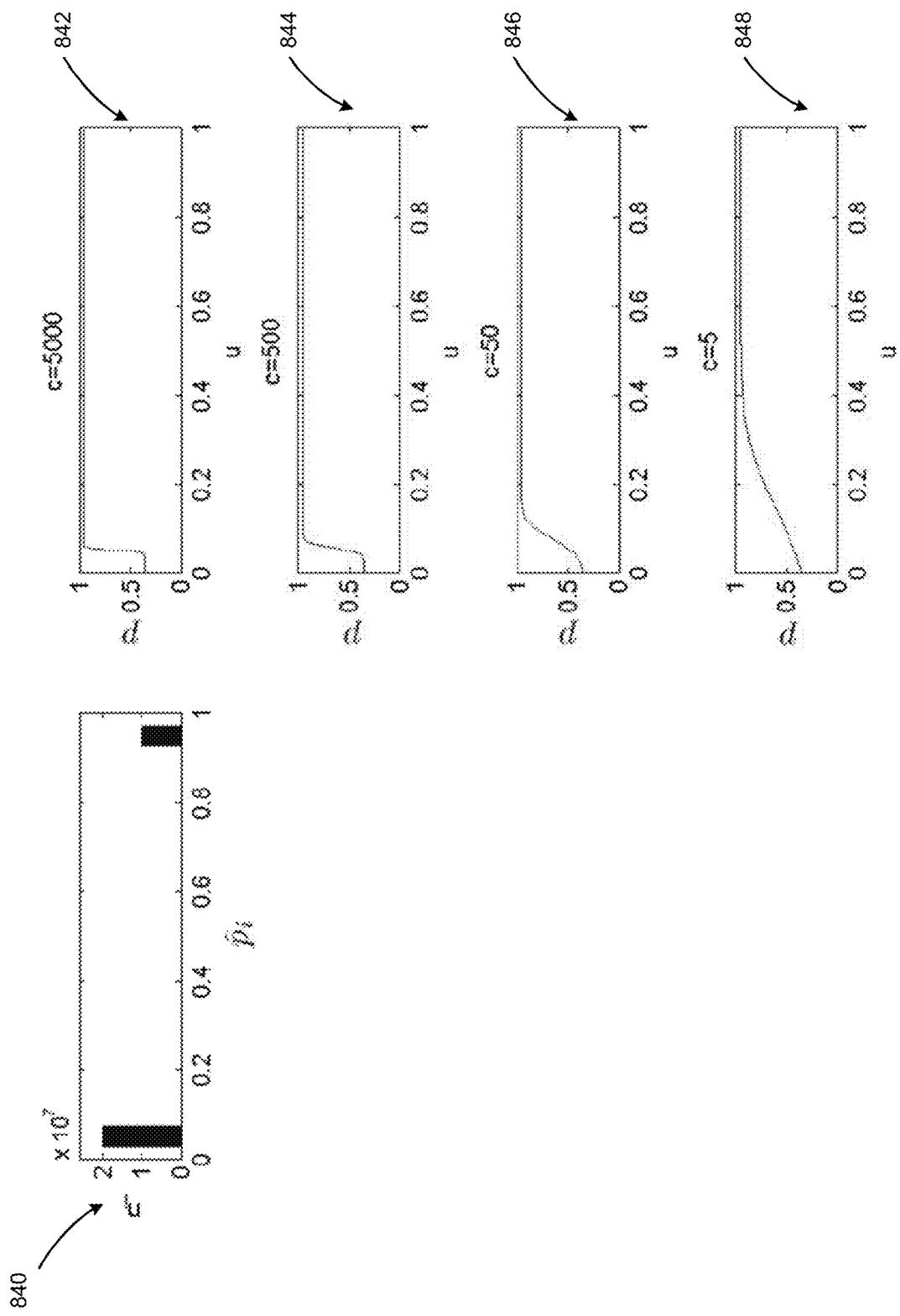
FIG. 8E shows the relationship between a campaign-level event rate as a function of the campaign-level control signal for different values of the actuator configuration parameter for another online campaign.

FIG. 8E shows the relationship between a campaign-level event rate (p) as a function of the campaign-level control signal (u) for different values of the actuator configuration parameter for another online campaign. Histogram 840 shows the distribution of segment-level event rates for all segments of the online campaign. Note that the event rates for the online campaign of FIG. 8E are more extremely distributed than those of FIG. 8D. That is to say that each impression of plot 840 is associated with either a very small or a very large event rate. Plots 842, 844, 846, and 848 show the response curves (p(u)) for c=5000, 500, 50, and 5 respectively. Actuation with larger actuator configuration parameters resembles threshold allocation.

Figure 9A:
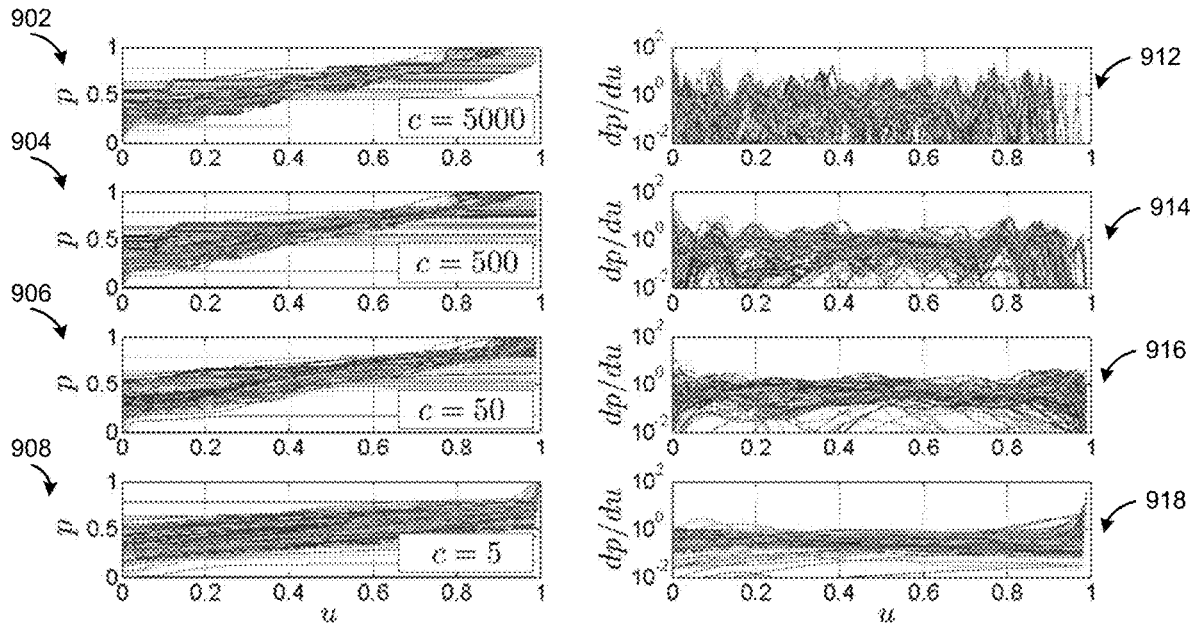
FIG. 9A shows the rate and the gain for a control system for various values of the actuator configuration parameter.

FIG. 9A shows the event rate and the gain for the plant for various values of the actuator configuration parameter for a large number of different campaigns. Each curve in FIG. 9A corresponds to a separate campaign. In each of plots of FIG. 9A, two-hundred online campaigns were controlled via the various embodiments discussed herein. A curve for each of the two-hundred online campaigns is shown in each of plots 902-918. More specifically, plots 902, 904, 906, and 908 show the continuous relationship between (p(u)) and u for c=5000, 500, 50, and 5, respectively. Plots 902, 904, 906, and 908 show the gain of the plant, as a function of u for c=5000, 500, 50, and 5, respectively. Each of the curves in plots 902-918 was obtained in a similar manner to the analogous curves of FIGS. 8D and 8E.

Figure 9B:
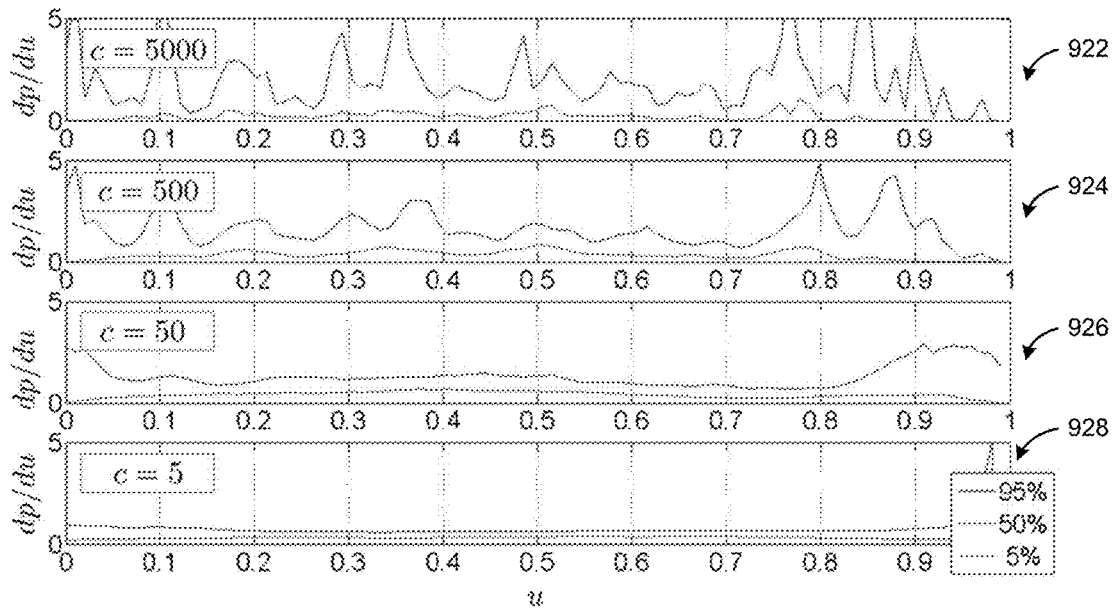
FIG. 9B shows three percentile curves of the rate gain for the real ad campaigns in FIG. 9A and various values of the actuator controller configuration parameter.

FIG. 9B shows the gain for various values of the actuator configuration parameter, of various percentiles of the gain curves of FIG. 9A. Briefly, each of the two-hundred curves of plots 912, 914, 916, and 916 are sorted and ranked. Analogous plots 922, 924, 926, and 928 show the 95%, 50%, and 5% gain curve for each of plot 912, 914, 916, and 918 respectively. Note that a larger value for the actuator configuration parameter results in a more erratic plant response curve, while a smaller value for the actuator configuration parameter results in a more uniform gain. In various embodiments, the actuator configuration parameter may be selected to be approximately 50.

Exemplary Embodiments of an Event-Rate Estimator

The various embodiments are directed towards controlling the event rates for content delivered and/or provided within a segmented online campaign. As noted, event rates for various event types may be controlled. Such event types include, but are not otherwise limited to clicks, conversions, viewable impressions, in-target impressions, completed-video impressions, and the like. Some of the embodiments discussed below are directed towards controlling the in-view event rates (or rates of viewable impressions). However, it should be understood that embodiments are enabled to control the rate for any event type, and are not limited in scope to controlling the in-view event rates.

An event-rate estimator, such as but not limited to event-rate estimator 340 of FIG. 3A, updates the campaign-level rate-estimate signal($\hat{p}$). In some embodiments, the campaign-level rate-estimate signal is a time-dependent signal and is updated periodically at sample times $t_k$. Accordingly, the event-rate estimator may update time dependent campaign-level signal ($\hat{p}(t_k)$). As such, an event-rate estimator may enable, perform, and/or execute at least portions of process 700 of FIG. 7A and/or pseudo-code 720 of FIG. 7B. In some embodiments, a gross-based (or total-based) campaign-level rate-estimate signal is determined. In other embodiments, a measured-based campaign-level rate-estimate signal is determined.

In various embodiments, sampled impression signals may be received. For instance, sampled impression signals from a market, such as but not limited to market 330 of FIG. 3A. Such sampled impression signals may include the number (across all campaign segments) of viewable impressions at sample time ($n_{view}(t_k)$). Another sampled impression signal may include the number (across all campaign segments) of measureable impressions at sample time $t_k$ ($n_{meas}(t_k)$). Another impression signal that may be sampled, or determined based on other sampled signals, includes the total number (across all campaign-segments) of impressions at sample time $t_k$ ($n_{tot}(t_k)$). The sample period may be a rate-estimator configuration parameter: sampling time period (h). In various embodiments, the sampling period is approximately 15 minutes. Impression signals may be included in input signals.

Marginal impression signals may be determined based on the sampled impression signals and another rate-estimate configuration parameter, the forgetting factor ($\lambda$), where $\lambda \in (0, 1)$. In at least one embodiment, $\lambda=0.9$. Such marginal impression signals may include the marginal total number of impression $n_{tot}(t_k)$, the marginal number of viewable impression ($n_{view}(t_k)$), and the marginal number of measured impression ($n_{meas}(t_k)$). In various embodiments, the marginal impression signals may be determined as follows.

$$n_{tot}^{ma}(t_k) = \lambda^h n_{tot}^{ma}(t_{k-1}) + n_{tot}(t_k)$$

$$n_{view}^{ma}(t_k) = \lambda^h n_{view}^{ma}(t_{k-1}) + n_{view}(t_k)$$

$$n_{meas}^{ma}(t_k) = \lambda^h n_{meas}^{ma}(t_{k-1}) + n_{meas}(t_k)$$

where $n_{tot}^{ma}(t_k)$, $n_{view}^{ma}(t_k)$, and $n_{meas}^{ma}(t_k)$ are states of the event rate estimator.

A rate-estimator state may be initialized as $$n_{tot}^{ma}(t_0) = n_{tot}^0$$

$$n_{view}^{ma}(t_0) = n_{view}^0$$

$$n_{meas}^{ma}(t_0) = n_{meas}^0$$

The campaign-level rate-estimate signal may be updated as follows. For gross-based embodiments $$\hat{p}(t_k) = \max\left(\min\left(\frac{n_{view}^{ma}(t_k)}{n_{tot}^{ma}(t_k)}, 1\right), 0\right)$$

and for measured-based embodiments $$\hat{p}(t_k) = \max\left(\min\left(\frac{n_{meas}^{ma}(t_k)}{n_{tot}^{ma}(t_k)}, 1\right), 0\right)$$

Exemplary Embodiments of an Event-Rate Controller

An event-rate controller, such as but not limited to event-rate controller 310 of FIG. 3A, updates the control signal (u). In some embodiments, the control signal is a time-dependent signal and is updated periodically at sampling instants $t_k$. Accordingly, the event-rate controller may update time dependent control signal($u(t_k)$). As such, an event-rate controller may enable, perform, and/or execute at least portions of process 500 of FIG. 5A and/or pseudo-code 520 of FIG. 5B.

The time-dependent campaign-level rate-estimate signal ($\hat{p}(t_k)$) may be interpreted as a feedback signal into a control system, in terms of the average campaign-level rate. Such control systems include but are not limited to control system 300 of FIG. 3A. One such measure of the performance of a control system is an error signal based on a comparison and/or difference between the rate threshold ($p^{ref}(t_k)$) and the campaign-level rate estimate. One such error signal may be determined as follows.

$$e(t_k) = p^{ref}(t_k) - \hat{p}(t_k)$$

In various embodiments, the event-rate controller may be a proportional-integral (PI) controller, although other embodiments are not so constrained and may not be a PI controller. Other controllers may be employed. For instance, various embodiments include event-rate controllers that employ other controlling methods, techniques, or sub-systems. For instance, an event-rate controller may be an optimal controller, a Lyapunov-based controller, a stochastic controller, a model predictive controller, and the like. In at least one embodiment, the PI controller includes windup protection. Various embodiments of the event-rate controller are configured via one or more controller configuration parameters. Such controller configuration parameters include, but are not otherwise limited to a design factor ($T_{int}^{norm}$) that is employed to determine an integrator time constant ($T_{int} = T_{int}^{norm} h$), where h is the sampling time period. Another controller configuration parameter may include another design factor ($T_{windup}^{norm}$) that is employed to determine a windup integrator time constant ($T_{windup} = T_{windup}^{norm} h$). In some embodiments, the integrator time constant and the windup integrator time constant are controller configuration parameters.

Additional controller configuration parameters may include a set-point weight (b) and a proportional gain (Kr) of the PI controller. When updating the control signal, the event-rate controller may determine and/or update additional signals, such as a set-point error ($e_p(t_k)$), a proportional signal ($P(t_k)$), an intermediate integral term ($I_{temp}(t_k)$), and an integral term (or windup correction signal) ($I(t_k)$). These signals may be determined and/or updated as follows.

$$e_p(t_k) = bp^{ref}(t_k) - \hat{p}(t_k)$$

$$P(t_k) = K_p e_p(t_k)$$

$$I_{temp}(t_k) = I_{temp}(t_{k-1}) + \frac{K_p h}{T_{int}} e(t_k)$$

$$u_{temp}(t_k) = P(t_k) + I_{temp}(t_k)$$

In some embodiments, controller configuration parameters may include upper and lower hard limits on the control signal $u^{min} < u^{max}$, $u^{min}, u^{max} \in [0,1]$ and a parameter ($\delta$) that constrains variations in the control signal. Note that these control configuration parameters may be time-dependent and may vary in value throughout an online campaign.

A controller state may be initialized as follows.

$$I(t_0) = 0$$

$$u(t_0) = u^{min}$$

An event-rate controller may additionally determine and/or update and an intermediate control signal($u_{temp}(t_k)$), a control-signal lower bound ($u_{low}(t_k)$), and a control-signal upper bound ($u_{high}(t_k)$) as follows.

IF $u^{min} \geq u(t_{k-1}) + \delta$ or $u^{max} \leq u(t_{k-1}) - \delta$, THEN $u_{low}(t_k) = u^{min}, u_{high}(t_k) = u^{max}$

ELSE $u_{low}(t_k) = \max(u(t_{k-1}) - \delta, u^{min}), u_{low}(t_k) = \min(u(t_{k-1}) + \delta, u^{max})$ In various embodiments, the event-rate controller updates the control signal as follows.

$$u(t_k) = \begin{cases} u_{low}(t_k), & \text{if } u_{temp}(t_k) < u_{low}(t_k) \\ u_{temp}(t_k), & \text{if } u_{low}(t_k) \leq u_{temp}(t_k) \leq u_{high}(t_k) \\ u_{high}(t_k), & \text{if } u_{temp}(t_k) > u_{high}(t_k) \end{cases}$$

The windup correction signal (or integrator term) may be updated as follows.

$$I(t_k) = I_{temp}(t_k) + \frac{h}{T_{windup}}(u(t_k) - u_{temp}(t_k))$$

In various embodiments, the following values of configuration parameters may be employed: $K_p = 0.17$, $T_{int}^{norm} = 3.33$, $T_{windup}^{norm} = 3.17$, $\lambda = 0.9$, $c = 50$, $b = 1$, $\delta = 0.1$, $u^{min} = 0$, $u^{max} = 0.9$.

Figure 10A:
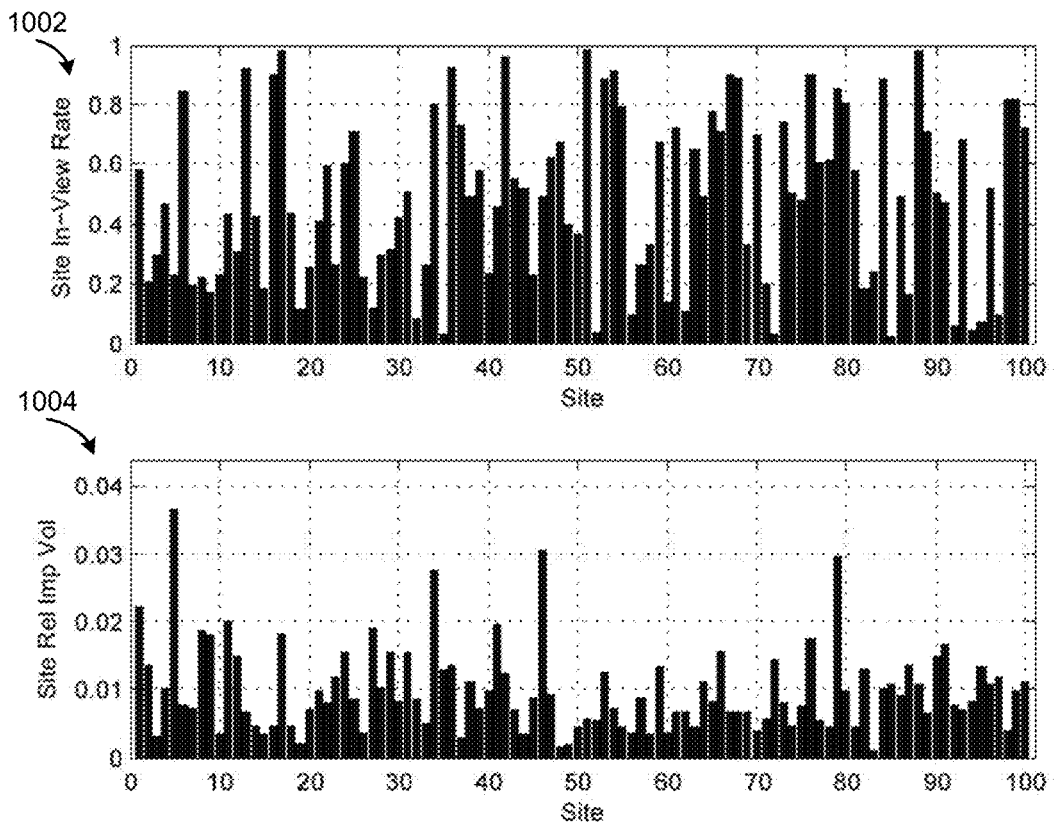
FIG. 10A displays segment-level rate-estimate signals and the corresponding relative impression volumes for a simulation of one of the various embodiments.

The various embodiments have been employed in various simulations of online campaigns. FIG. 10A displays segment-level rate-estimate signals and the corresponding relative impression volumes for a simulation of one of the various embodiments. Upper plot 1002 shows the simulation of the segment-level rate-estimate engines. Lower plot 1004 shows the corresponding relative impression volumes of the simulation.

Figure 10B:
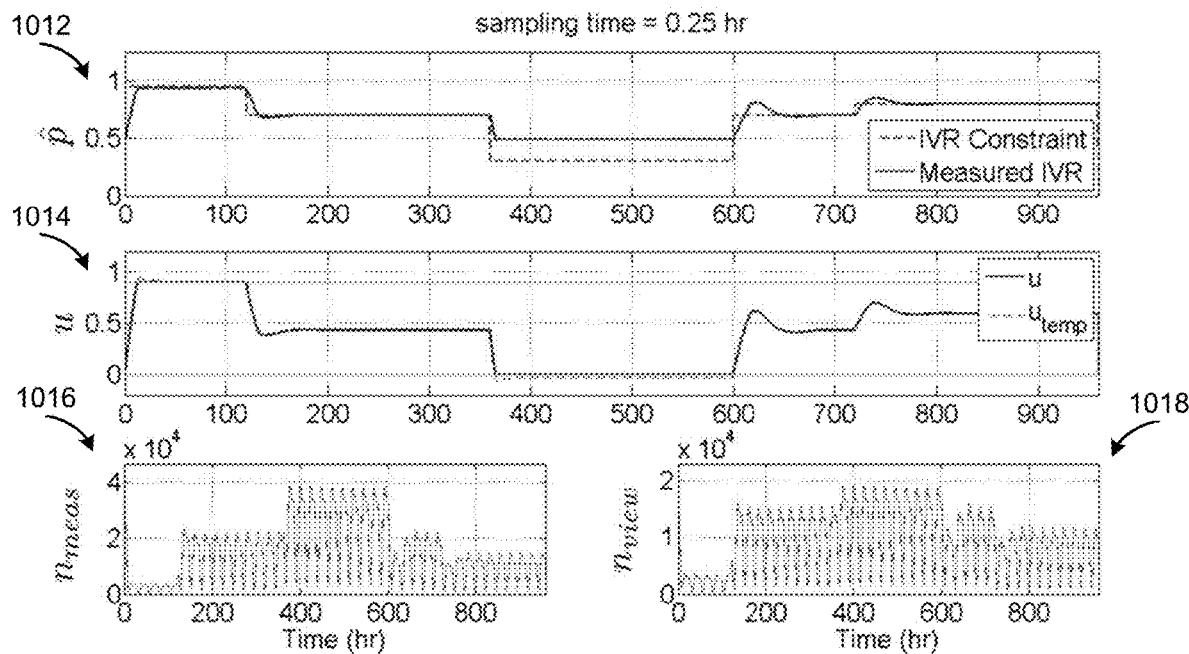
FIG. 10B includes various plots demonstrating the rate control performance of the closed-loop system employed in the simulation of FIG. 10A.

FIG. 10B includes various plots demonstrating the rate control performance of the closed-loop system employed in the simulation of FIG. 10A. Upper plot 1012 of FIG. 10B shows the time history for the campaign-level rate-estimate signal (the solid curve), as well as the rate threshold signal (the dashed curve). The time history of the control signal (the solid curve) as well as the intermediate control signal (the dashed curve) is shown in middle plot 1014. Lower left plot 1016 shows the total awarded impression volume and the lower right plot 1018 shows the viewable impression volume. Plot 1012 shows how the various embodiments provide an event-rate controller that regulates the event rates, based on the threshold signal.

Generalized Processes for Controlling Campaign-Level Event Rates

Figure 4:
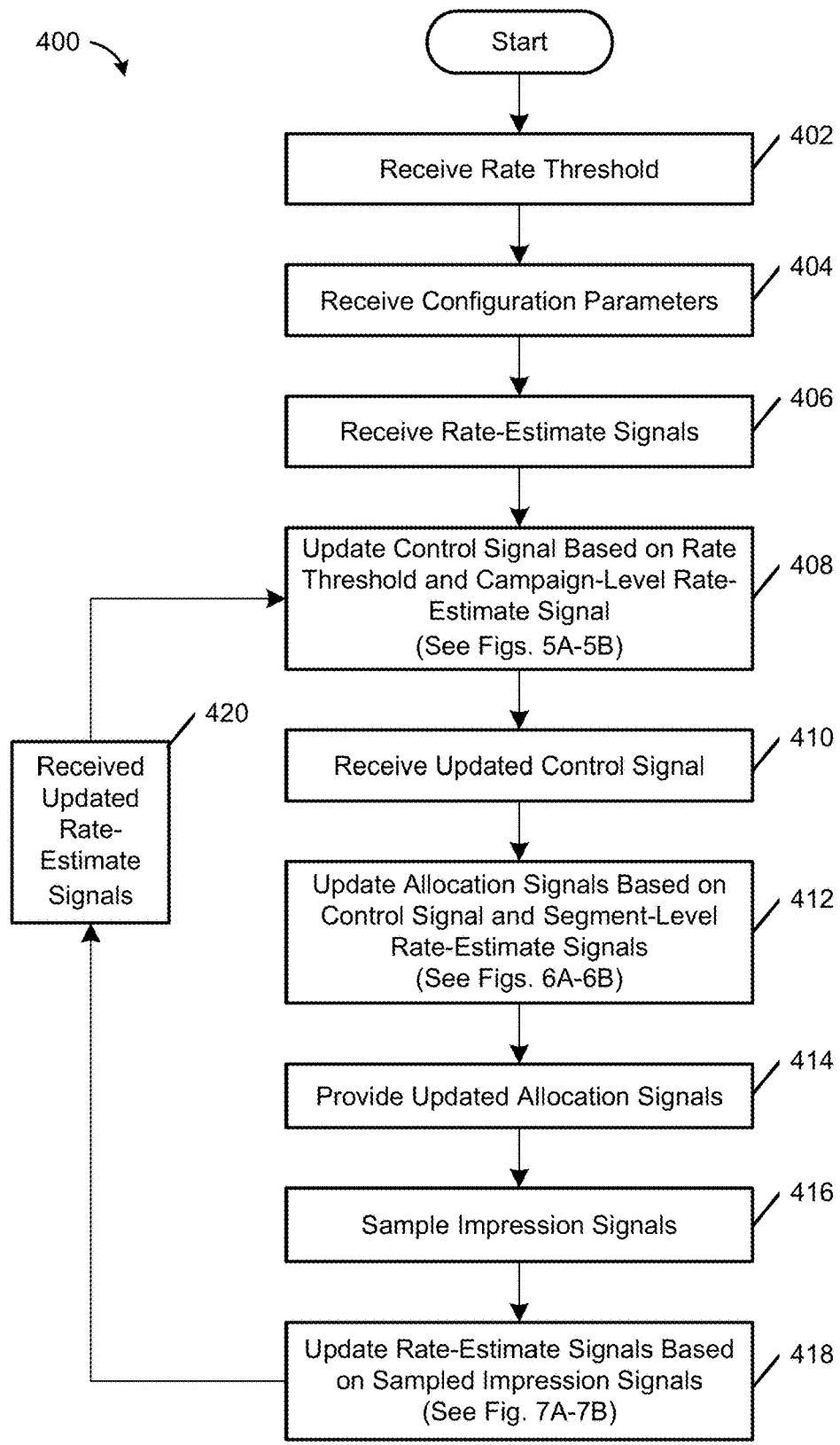
FIG. 4 depicts an illustrative process flow for controlling the campaign-level event rate, in accordance with various embodiments of the present disclosure.

FIG. 4 depicts an illustrative process flow for controlling the campaign-level event rate, in accordance with various embodiments of the present disclosure. Process 400 may be carried out by any of the various embodiments described herein, including but not limited to control system 108 of FIGS. 1-2, as well as control system 300 of FIG. 3A. Process 400 begins, after a start block, at block 402 where a rate threshold is received. In various embodiments, the rate threshold may be received by virtually any means, including being received from a content provider. In at least one embodiment, a content provider, or another user, provides the received rate threshold. The rate threshold may be received via any communication mechanism, including over a wired and/or wireless communication network, such as but not limited to internet 110 of FIG. 1. The rate threshold may be referred to throughout as $p^{ref}$. The rate threshold may be received by an event-rate controller, such as but not limited to event-rate controller 310 of FIG. 3A.

At block 404, configuration parameters may be received. In the various embodiments, the configuration parameters may be received by virtually any means, including being received from a content provider. The configuration parameters may include, but are not limited to controller configuration parameters, actuator configuration parameters, rate-estimator configuration parameters, and the like. Controller parameters may be received at an event-rate controller, such as but not limited to event-rate controller 310. Actuator configuration parameters may be received at an event-rate actuator, such as but not limited to event-rate actuator 320 of FIG. 3A. One or more estimator configuration parameters may be received at an event-rate estimator, such as but not limited to event-rate estimator 340 of FIG. 3A A received actuator configuration parameter may include, but is not limited to a configuration parameter for a beta actuator, which may be referred to as c throughout. Received controller configuration parameters may include, but are not limited to an integrator time constant ($T_{int}$), a windup integrator time ($T_{windup}$), a proportional gain for the controller ($K_p$), upper and lower hard limits on the control signal ($u^{min}$, $u^{max}$), sampling time period (h), set-point weight (b), a parameter ($\delta$) that constrains variations in the control signal, and the like. Rate-estimator configuration parameters may include sampling time period (h), a forgetting factor ($\lambda$), and the like.

At block 406, one or more rate-estimate signals are received. The received rate-estimate signals may include, but are not limited to a campaign-level rate-estimate signal ($\hat{p}$), as well as a segment-level rate-estimate signals ($\hat{p}_i$). The campaign-level rate estimate signal may be received at an event-rate controller. The segment-level rate estimate signals may be received at an event-rate actuator.

At block 408, a control signal (u) is updated. Various embodiments for updating the control signal are discussed throughout, including at least in conjunction with process 500 of FIG. 5A and pseudo-code 520 of FIG. 5B. However, briefly here, at block 408, the control signal may be updated based on the rate threshold and one or more rate-estimate signals, such as but not limited to a campaign-level rate-estimate signal. An event-rate controller may update the control signal.

At block 410, the updated control signal is received. In some embodiments, an event-rate actuator may receive the updated control signal. The event-rate controller may provide the updated control signal to the event-rate actuator.

At block 412, one or more bid allocation signals ($a_i$) are updated. Various embodiments for updating the bid allocation signals are discussed throughout, including at least in conjunction with process 600 of FIG. 6A and pseudo-code 620 of FIG. 6B. However, briefly here, at block 412, a bid allocation signal (or simply an allocation signal) for each of the campaign segments may be updated based on the updated control signal and segment-level rate-estimate signals for one or more of the campaign segments. For instance, a function of the control signal and each of the segment-level rate-estimate signals may be employed to update each of the allocation signals. An event-rate actuator may update the allocation signals for the campaign segments.

As discussed throughout, one exemplary but non-limiting embodiment of the function of the control signal and each of the segment-level rate-estimate signals is references as $g(\hat{p}_i, u)$ in conjunction with at least FIGS. 3A and 3B. The function may be a continuous function. The function is a function of the control signal and provides a relationship between the control and each of the allocation signals. Because the function may be a continuous function, the relationship between the control signal and each of the allocation signals may be a continuous relationship. As discussed in the conjunction with at least FIG. 3B, the function may be a monotonically decreasing function of the control signal, such that for the relationship between the control signal and each of the allocation signals, as each of the segment-level rate-estimate signals is continuously increased, the corresponding allocation signal is continuously increased.

The function may be a function of each of the segment-level rate estimate signals and provide a relationship between each of the plurality of segment-level rate-estimate signals and a corresponding allocation signal of the allocation signals. This relationship may be a continuous relationship. As discussed in the conjunction with at least FIG. 3B, the function may be a monotonically increasing function of each of the segment-level rate-estimate, such that for the relationship between the control signal and each of the allocation signals, as the control signal is continuously increased, each of the plurality of allocation signals is continuously decreased.

At block 414, the one or more updated allocation signals may be provided. In some embodiments, the event-rate actuator may provide the updated allocation signals for each campaign segment to a market, such as but not limited to market 330. An allocation signal may indicate one or more bid allocations. As noted above, a bid allocation may refer to the percentage of auctions that a content provider would like to participate to "win" impressions for a particular segment in an online campaign. As also noted above, a bid may include both a bid allocation and a bid price. Accordingly, a bid price may be provided to market 330. For example, for each provided bid, a bid price may be included in one or more of the allocation signals. Depending on the bid price compared to the bid price provided by other content providers, the content provider may win, at least a portion of the bid upon impressions. As a result, market 330 will provide impressions to users corresponding to the won bids for impressions. At least a portion of the provided impressions may be, or may become, one or more of the events of interest.

At block 416, one or more impression signals are sampled from the market. The sampled impression signals may be provided to and/or received at an event-rate market estimator, such as event-rate estimator 340 of FIG. 3A. The one or more impression signals may include, or at least indicate, a total number of provided impressions for each segment of the campaign, as well as a total number of impressions for the campaign. Furthermore, the one or more impression signals may include, or at least indicate, a number of events of interest.

At block 418, one or more rate-estimate signals are updated. Various embodiments for updating the rate-estimate signals are discussed throughout, including at least in conjunction with process 700 of FIG. 7A and pseudo-code 720 of FIG. 7B. However, briefly here, at block 418, a segment-level rate-estimate signal ($\hat{p}_i$) for each of the campaign segments may be updated based on the sampled impressions signals. Furthermore, at block 418, a campaign-level rate-estimate signal ($\hat{p}$) may be updated based on the sampled impression signals. An event-rate actuator may update the rate-estimate signals.

Note that due to the continuous relationship between the segment-level rate-estimate signals and the corresponding allocation signal that is provided by the function of control signal and the segment-level rate-estimate signals (as discussed above), volatile or noisy segment-level rate-estimate signals will not result in extreme variations or updates in the corresponding allocation signals. Similarly, due to the continuous relationship between the control signal and the allocation signals provided by this function, a volatile or noisy control signal will not result in extreme variations or updates in the allocation signals.

At block 420, the updated rate estimate signals are received. In some embodiments, the updated campaign-level rate-estimate signal may be received at the event-rate controller. The updated segment-level rate-estimate signals for each of the campaign segments may be received at the event-rate actuator. In some embodiments, the event-rate estimator may provide the updated event-rate-estimate signals to at least one of the event-rate controller and/or the event-rate actuator. Process 400 returns to block 408 to update the control signal based on the updated campaign-level rate-estimate signal.

Figure 5A:
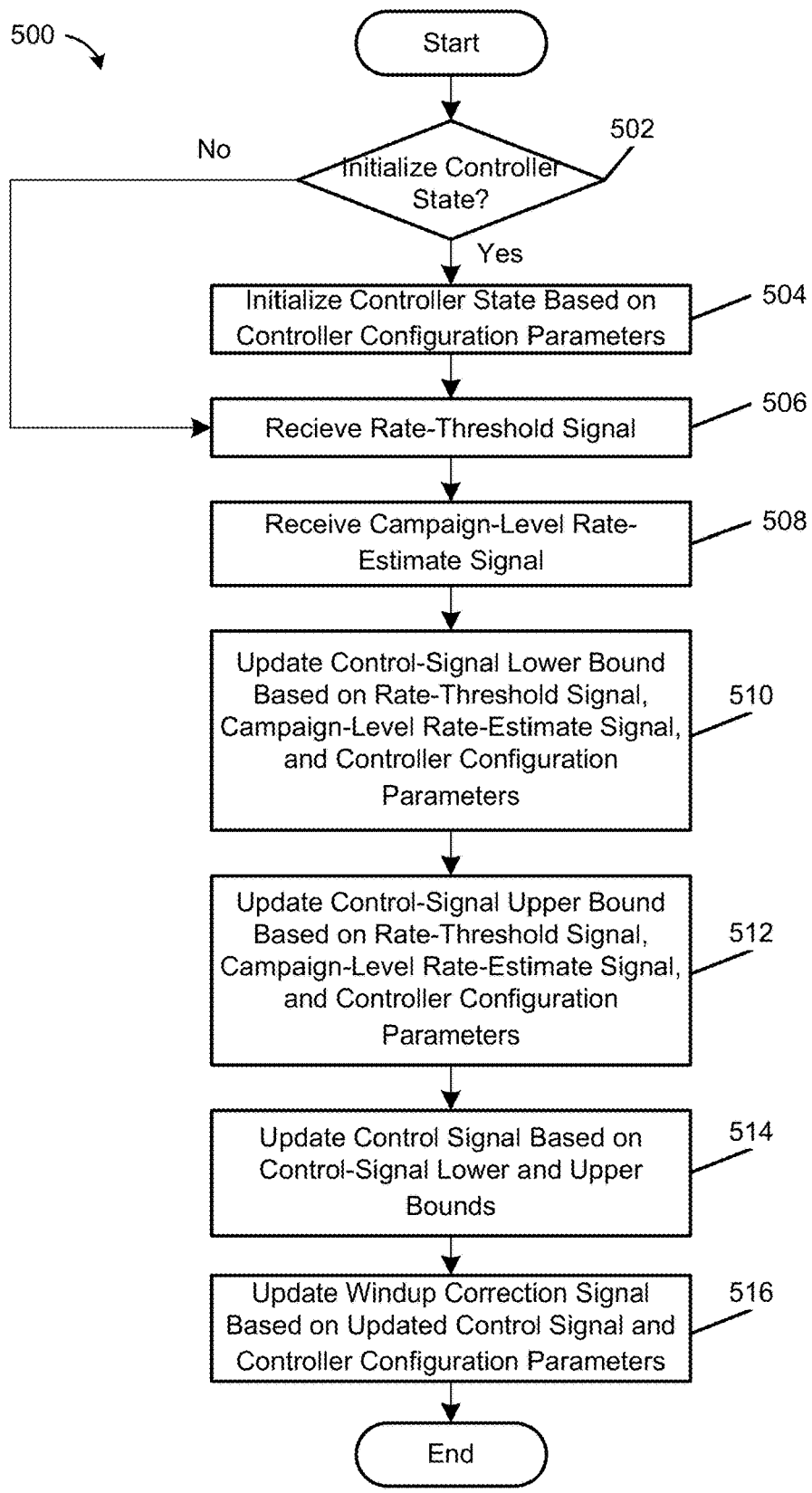
FIG. 5A depicts an illustrative process flow for updating a control signal, in accordance with various embodiments of the present disclosure.

FIG. 5A depicts an illustrative process flow for updating a control signal, in accordance with various embodiments of the present disclosure. Process 500 of FIG. 5A is discussed in conjunction with pseudo-code 520 of FIG. 5B. FIG. 5B depicts illustrative pseudo-code 520 that can be utilized for updating a control signal, in accordance with various embodiments of the present disclosure. Process 500 may be at least partially enabled, performed and/or executed by an event-rate controller, such as but not limited to event-rate controller 310 of FIG. 3A.

Various embodiments of process 500 and/or pseudo-code 520 are described in within the "Exemplary Embodiments of an Event-Rate Controller" section above. For process 500 and pseudo-code 520, each of the discussed signals may be time-dependent signals. Accordingly, when discussing a particular signal, the single may be sampled at the k-th temporal sample time($t_k$).

As shown in line 2 of pseudo-code 520, process 500 employs a rate-threshold signal ($p^{ref}(t_k)$) and a campaign-level rate-estimate signal ($\hat{p}(t_k)$) as received and/or input signals, where $t_k$ represents the k-th temporal sample time. Line 3 of pseudo-code 520 shows that process 500 provides an updated control signal ($u(t_k)$) as an output signal.

Line 1 of pseudo-code 520, shows various controller configuration parameters that process 500 may employ. Controller configuration parameters may include, but are not limited to an integrator time constant ($T_{int}$), a windup time constant ($T_{windup}$), a proportional gain for the controller ($K_p$), upper and lower hard limits on the control signal ($u^{min}$, $u^{max}$), sampling time period (h), set-point weight (b), parameter to confine variations ($\delta$), and the like.

Process 500 begins, after a start block, at decision block 502, where it is determined whether to initialize a controller state. For example, a first call to process 500 may require an initialization of a controller state. If the controller state requires initialization, process 500 flows to block 504. Otherwise, process 500 flows to block 506.

At block 504, the controller state is initialized based on the controller configuration parameters. Various embodiments of initializing the controller state based on the controller configuration parameters are discussed throughout. Line 4 of pseudo-code 520 shows one embodiment for initializing the controller state.

At block 506, the rate-threshold signal is received. For instance, a content provider may provide a constant or time-dependent rate-threshold signal. The rate-threshold signal may be received at the event-rate controller.

At block 508, the campaign-level rate-estimate signal ($\hat{p}(t_k)$) is received. For instance, an event-rate estimator, such as but not limited to event-rate estimator 240 of FIG. 3A may provide the campaign-level rate-estimate signal to the event-rate controller.

At block 510, a control-signal lower bound ($u_{low}(t_k)$) is updated. Updating the control-signal lower bound is based on the rate-threshold signal, the campaign-level rate-estimate signal, and the controller configuration parameters. Various embodiments for updating the control-signal lower bound are discussed throughout. Lines 8-20 of pseudo-code 520 show one such embodiment for determining a control-signal lower bound. The control-signal lower bound may be a control-signal lower signal.

At block 512, a control-signal upper bound ($u_{high}(t_k)$) is updated. Updating the control-signal upper bound is based on the rate-threshold signal, the campaign-level rate-estimate signal, and the controller configuration parameters. Various embodiments for updating the control-signal upper bound are discussed throughout. Lines 8-20 of pseudo-code 520 show one such embodiment for determining a control-signal upper bound. The control-signal upper bound may be a control-signal upper signal.

At block 514, the control signal is updated based on the control-signal lower and upper bounds. Various embodiments for updating the control signal are discussed throughout. Lines 22-28 of pseudo-code 520 show one such embodiment for updating the control signal based on the control-signal upper and lower bounds.

At block 516, a windup correction signal ($I(t_k)$) is updated based on the updated control signal and one or more of the controller configuration parameters. At least one embodiment of updating the windup correction is discussed above. Line 30 of pseudo-code 520 shows one such embodiment for updating the windup correction signal based on the updated control signal and one or more of the controller configuration parameters. The windup correction signal may be an integrator term. Process 500 may terminate and/or return a calling process.

Figure 6A:
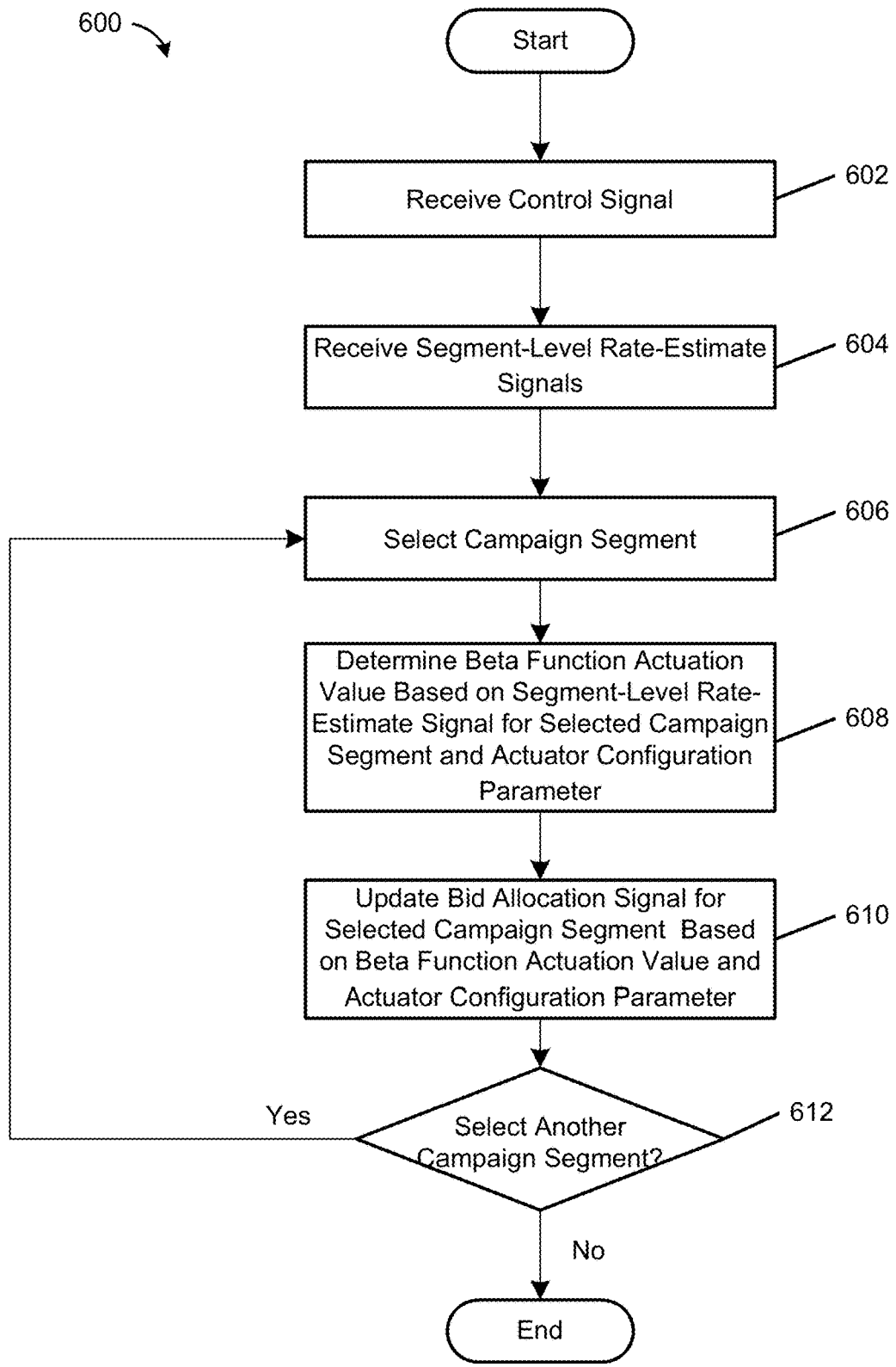
FIG. 6A depicts an illustrative process flow for updating bid allocation signals, in accordance with various embodiments of the present disclosure.

FIG. 6A depicts an illustrative process flow for updating bid allocation signals, in accordance with various embodiments of the present disclosure. Process 600 of FIG. 6A is discussed in conjunction with pseudo-code 620 of FIG. 6B. FIG. 6B depicts illustrative pseudo-code 620 that can be utilized for updating bid allocation signals, in accordance with various embodiments of the present disclosure. Process 600 may be at least partially enabled, performed, and/or executed by an event-rate actuator, such as but not limited to event-rate actuator 320 of FIG. 3A.

Various embodiments of process 600 and/or pseudo-code 620 are described in within the "Exemplary Embodiments of an Event-Rate Actuator" section above. For process 600 and pseudo-code 620, each of the discussed signals may be time-dependent signals. Accordingly, when discussing a particular signal, the signal may be sampled at the k-th temporal sample time ($t_k$).

As shown in line 2 of pseudo-code 620, process 600 employs a control signal ($u(t_k)$) and a segment-level rate-estimate signal ($\hat{p}_i(t_k)$) for each of the campaign segments as received and/or input signals, where $t_k$ represents the k-th temporal sample time. Line 3 of pseudo-code 620 shows that process 600 provides an updated plurality of bid allocation signals ($a_i(t_k)$), where each corresponds to a campaign segment, as an output signal. Line 1 of pseudo-code 620, shows an actuator configuration parameter (c) that process 600 may employ.

In various embodiments, an event-rate actuator that enables, performs, and/or executes at least portions of process 600 is static. That is to say that the event-rate actuator does not require an initialization and/or memory to access previous states. Accordingly, the event-actuator is stateless and is thus computationally efficient.

Process 600 begins, after a start block, at block 602, where the control signal is received. For instance, an updated control signal may be received, at the event-rate actuator, from the event-rate controller. At block 604, the segment-level rate-estimate signals are received for each of the campaign segments. For example, updated segment-level rate-estimate signals may be received, at the event-rate actuator, from the event-rate estimator.

Blocks 606 through 612 of process 600 form a control loop. One embodiment of such a control loop in shown through lines 7-11 of pseudo-code 620. At block 606, a campaign segment is selected. At block 608, a beta function actuation value ($B(\hat{p}_i(t_k)|\alpha, \beta)$) is determined based on the segment-level rate-estimate signal for the selected campaign segment, as well as the actuator configuration parameter. Various embodiments for determining a beta function actuation value are discussed throughout. Lines 8-10 of pseudo-code 620 show one embodiment for determine a beta function actuation value.

At block 610, the bid allocation signal ($a_i(t_k)$) for the selected campaign segment is updated based on the beta actuation function actuation value and the actuator configuration parameter. Embodiments for updating the bid allocation signal are discussed throughout. Line 10 of pseudo-code 620 shows one embodiment for updating the bid allocation signal for the selected campaign segment.

At decision block 612, it is determined whether select another campaign segment. If more campaign segments are to be selected, process 600 returns to block 606. Otherwise, process 600 may terminate and/or return a calling process.

Figure 7A:
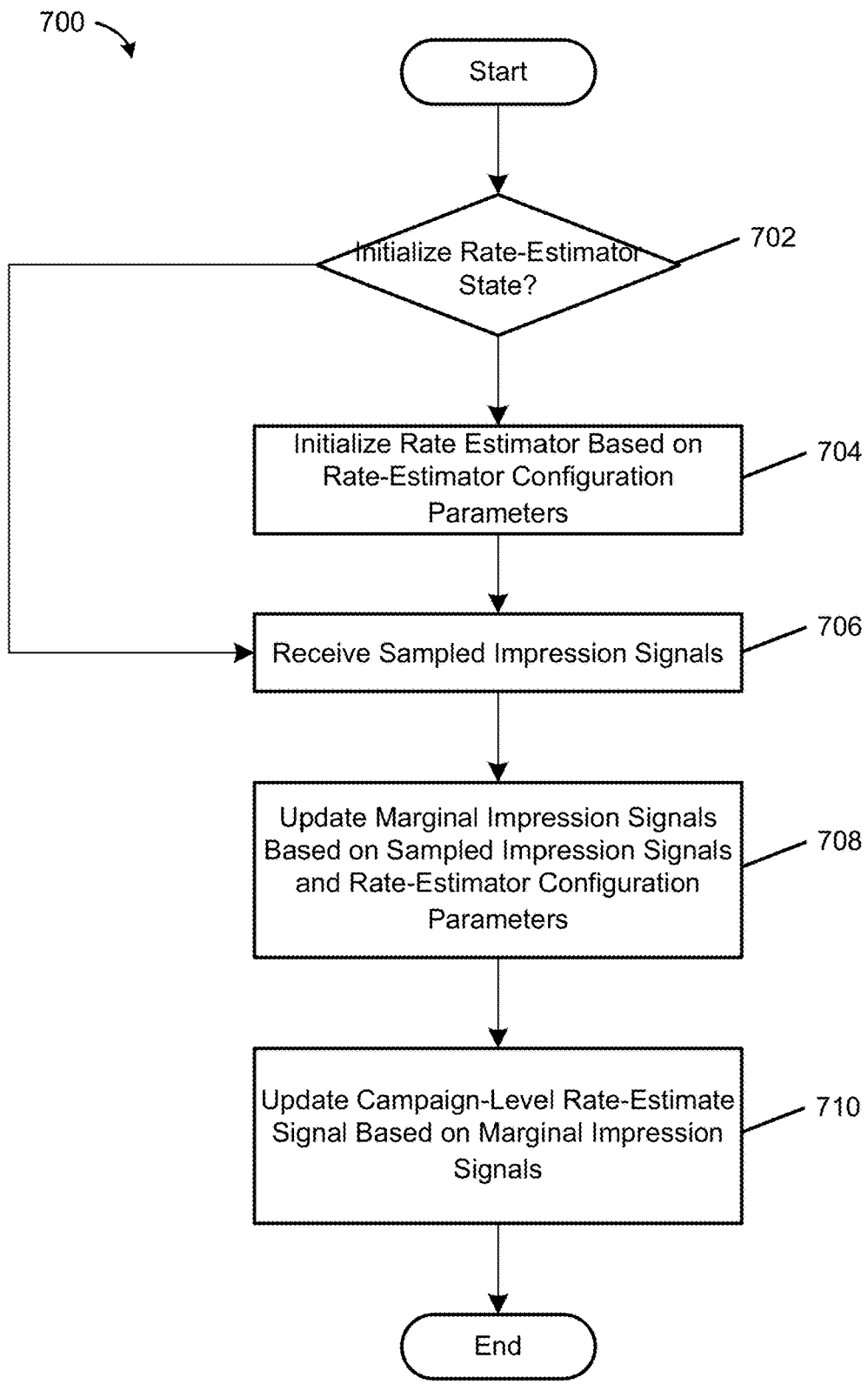
FIG. 7A depicts an illustrative process flow for updating rate-estimate signals, in accordance with various embodiments of the present disclosure.

FIG. 7A depicts an illustrative process flow for updating rate-estimate signals, in accordance with various embodiments of the present disclosure. Process 700 of FIG. 7A is discussed in conjunction with pseudo-code 720 of FIG. 7B. FIG. 7B depicts illustrative pseudo-code 720 that can be utilized for updating rate-estimate signals, in accordance with various embodiments of the present disclosure. Process 700 may be at least partially enabled, performed and/or executed by an event-rate estimator, such as but not limited to event-rate estimator 340 of FIG. 3A.

Various embodiments of process 700 and/or pseudo-code 720 are described within the "Exemplary Embodiments of an Event-Rate Estimator" section above. For process 700 and pseudo-code 720, each of the discussed signals may be time-dependent signals. Accordingly, when discussing a particular signal, the signal may be sampled at the k-th temporal sample time ($t_k$).

As shown in line 2 of pseudo-code 720, process 700 may employ sampled impression signals as input. For instance, input signal $n_{view}(t_k)$ may represent the number (across all campaign segments) of viewable impressions at sample time $t_k$. Similarly, input signal $n_{meas}(t_k)$ may represent the number (across all campaign segments) of measureable impressions at sample time $t_k$. Input signal $n_{tot}(t_k)$ may represent the total number (across all campaign-segments) of impressions at sample time $t_k$. Each of the number of viewable impression, measureable impression, and the total number of impressions may be impression volumes and may be a sampled impression signal. Line 3 of pseudo-code 720 shows that process 700 provides an updated campaign-level rate-estimate signal ($\hat{p}(t_k)$) as an output signal.

Line 1 of pseudo-code 720, shows various rate-estimator configuration parameters that process 700 may employ. Rate-estimator configuration parameters may include, but are not limited to sampling time period (h), a forgetting factor ($\lambda$), and the like. In at least one embodiment, the sampling time period is approximately 15 minutes. In some embodiments, the forgetting factor is approximately 0.9.

Process 700 begins, after a start block, at decision block 702, where it is determined whether to initialize a rate-estimator state. For example, a first call to process 700 may require an initialization a rate-estimator state. If the rate-estimator state requires initialization, process 700 flows to block 704. Otherwise, process 700 flows to block 706.

At block 704, the rate-estimator state is initialized based on the rate-estimator configuration parameters. Various embodiments of initializing the rate-estimator state based on the rate-estimator configuration parameters are discussed throughout. Line 4 of pseudo-code 720 shows one such embodiment for initializing the rate-estimator state.

At block 706, sampled impression signals may be received. Such sampled impression signals may include the number (across all campaign segments) of viewable impressions at sample time ($n_{view}(t_k)$). Another sampled impression signal may include the number (across all campaign segments) of measureable impressions at sample time $t_k$ ($n_{meas}(t_k)$) Another impression signal that may be sampled, or determined based on other sampled signals, includes the total number (across all campaign-segments) of impressions at sample time $t_k$ ($n_{tot}(t_k)$). The sample period may be a rate-estimator configuration parameter: sampling time period (h). In various embodiments, the sampling period is approximately 15 minutes. In various embodiments, at least one of $n_{view}(t_k)$, $n_{meas}(t_k)$, and/or $n_{tot}(t_k)$ may be sampled from a market, such as but not limited to market 330 of FIG. 3A. The sampled impression signals may be received at an event-rate estimator.

At block 708, marginal impression signals are updated based on the sampled impression signals and the rate-estimator configuration parameters. Such marginal impression signals may include the marginal total number of impression $n_{tot}^{ma}(t_k)$, the marginal number of viewable impression ($n_{view}^{ma}(t_k)$), and the marginal number of measured impression ($n_{meas}^{ma}(t_k)$). Various embodiments for updating and/or determining marginal impression signals are discussed throughout. Lines 8-10 of pseudo-code 720 show one such embodiment for determining marginal impression signals.

At block 710, the campaign-level rate-estimate signal is updated based on the marginal impression signals. Various embodiments for updating the campaign-level rate-estimate signal are discussed throughout. Lines 12-16 of pseudo-code 720 show one such embodiment for updating the control-level rate-estimate signal. Process 700 may return and/or return a calling process.

Generalized Computing Device

Figure 11:
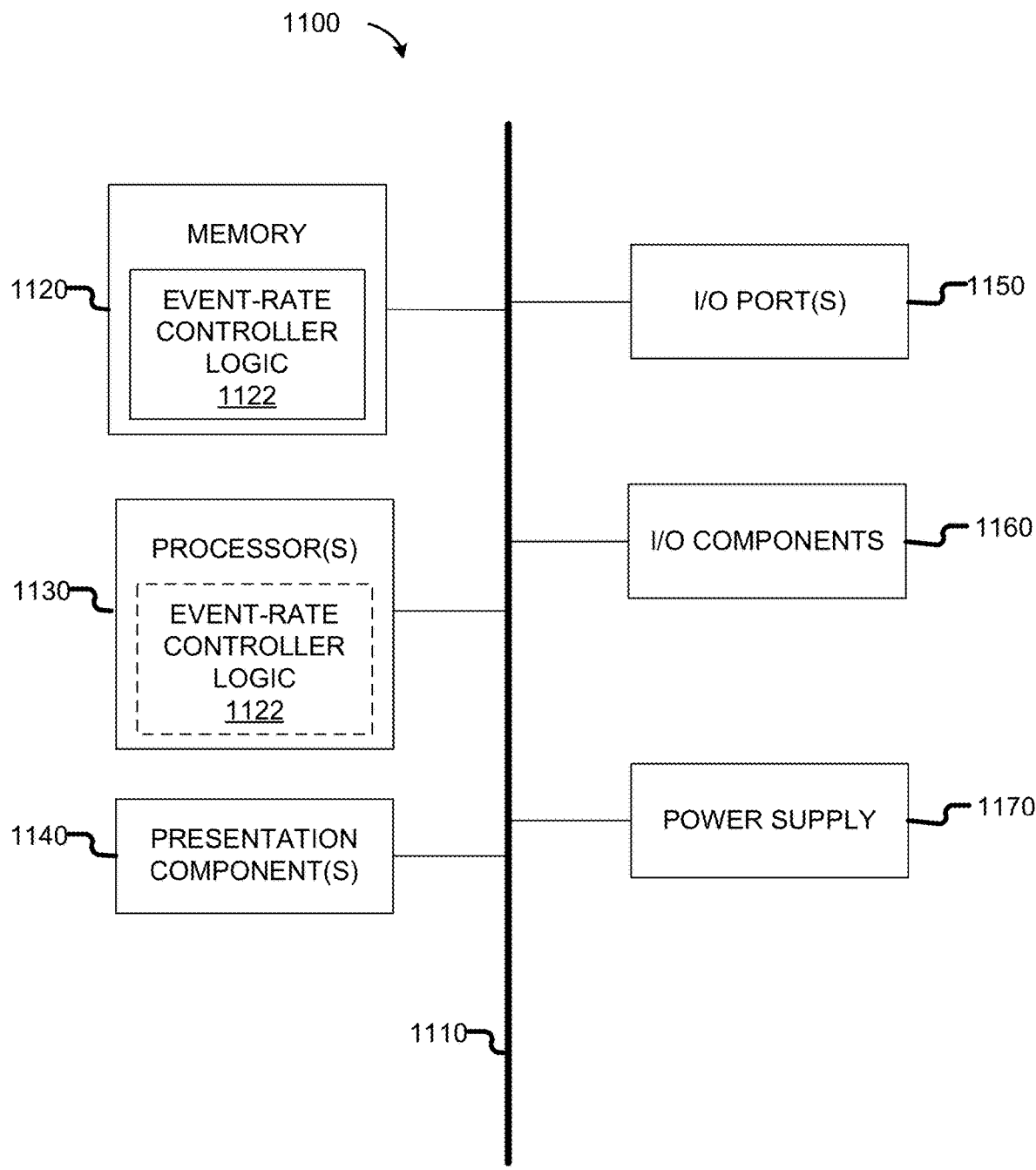
FIG. 11 is a block diagram of an example computing device in which various embodiments of the present disclosure may be employed.

With reference to FIG. 11, computing device 1100 includes a bus 1110 that directly or indirectly couples the following devices: memory 1120, one or more processors 1130, one or more presentation components 1140, input/output (I/O) ports 1150, I/O components 1160, and an illustrative power supply 1170. Bus 1110 represents what may be one or more busses (such as an address bus, data bus, or combination thereof). Although depicted in FIG. 11, for the sake of clarity, as delineated boxes that depict groups of devices without overlap between these groups of devices, in reality this delineation is not so clear cut and a device may well fall within multiple ones of these depicted boxes. For example, one may consider a display to be one of the one or more presentation components 1140 while also being one of the I/O components 1160. As another example, processors have memory integrated therewith in the form of cache; however, there is no overlap between the one or more processors 1130 and the memory 1120. A person of ordinary skill in the art will readily recognize that such is the nature of the art, and it is reiterated that the diagram of FIG. 11 merely depicts an illustrative computing device that can be used in connection with one or more embodiments of the present invention. It should also be noticed that distinction is not made between such categories as "workstation," "server," "laptop," "hand-held device," etc., as all such devices are contemplated to be within the scope of computing device 1100 of FIG. 11 and any other reference to "computing device," unless the context clearly indicates otherwise.

Computing device 1100 typically includes a variety of computer-readable media. Computer-readable media can be any available media that can be accessed by computing device 1100 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD- ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1120 includes computer-storage media in the form of volatile and/or nonvolatile memory. The memory may be removable, non-removable, or a combination thereof. Typical hardware devices may include, for example, solid-state memory, hard drives, optical-disc drives, etc. Computing device 1100 includes one or more processors 1130 that read data from various entities such as memory 1120 or I/O components 1160. Presentation component(s) 1140 present data indications to a user or other device. Illustrative presentation components include a display device, speaker, printing component, vibrating component, etc.

In various embodiments, memory 1120 includes, in particular, temporal and/or persistent copies of event-rate controller logic 1122. Event-rate controller logic 1122 includes instructions that, when executed by one or more processors 1130, result in computing device 1100 performing any of the processes and/or actions described above in reference to control system 108 of FIGS. 1-2, control system 300 of FIG. 3A, or processes 400, 500, 600, and 700 of FIGS. 4, 5A, 6A, and 7B respectively and/or any functionality depicted in pseudo-code 520, 620, and 720 of FIGS. 5B, 6B, and 7C respectively.

In some embodiments, one or more processors 1130 may be packaged together with event-rate controller logic 1122. In some embodiments, one or more processors 1130 may be packaged together with event-rate controller logic 1122 to form a System in Package (SiP). In some embodiments, one or more processors 1130 can be integrated on the same die with event-rate controller logic 1122. In some embodiments, processor 1130 can be integrated on the same die with event-rate controller logic 1122 to form a System on Chip (SoC).

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialized computing devices, etc. The invention may also be practiced in distributed computing environments where tasks are performed by remote-processing devices that are linked through a communications network.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method comprising:
   determine a control signal based on a comparison between a rate threshold and a campaign-level rate-estimate signal that corresponds to a probability that content previously provided in an online campaign is associated with an event;
   segmenting the online campaign into a plurality of campaign segments comprising a first campaign segment and a second campaign segment;
   determine one or more allocation signals comprising:
   (i) a first allocation signal, for the first campaign segment, indicative of a first probability of participating in bidding to provide subsequent content in the online campaign for the first campaign segment; and
   (ii) a second allocation signal, for the second campaign segment, indicative of a second probability of participating in bidding to provide the subsequent content in the online campaign for the second campaign segment, wherein the second probability is different than the first probability; and providing the subsequent content in the online campaign based on the one or more allocation signals, wherein the determining the one or more allocation signals is based on a ratio of:

an incomplete beta function based upon (i) time, (ii) a first shape parameter and (iii) a second shape parameter; to a second beta function of (i) the first shape parameter, for an actuator configuration parameter, of the control signal and (ii) the second shape parameter, for the actuator configuration parameter, of the control signal.

2. The computer-implemented method of claim 1, further comprising:

receiving one or more input signals that are generated in response to providing the subsequent content in the online campaign, wherein the one or more input signals correspond to a number of events associated with the subsequent content and a number of impressions associated with the subsequent content;

updating the campaign-level rate-estimate signal to generate an updated campaign-level rate-estimate signal based on the one or more input signals;

updating the control signal to generate an updated control signal based on a comparison between the rate threshold and the updated campaign-level rate-estimate signal; and updating the one or more allocation signals based on the updated control signal and a function that provides a continuous relationship between the control signal and each of the one or more allocation signals.

3. The computer-implemented method of claim 1, further comprising:

updating the one or more allocation signals based on a function, wherein the online campaign includes a plurality of campaign segments and updating the one or more allocation signals is further based on a plurality of segment-level rate-estimate signals, wherein each of the plurality of segment-level rate-estimate signals corresponds to one of the plurality of campaign segments and an event rate for the one of the plurality of campaign segments.

4. The computer-implemented method of claim 3, wherein the function further provides a continuous relationship between the plurality of segment-level rate-estimate signals and each of one or more segment-level allocation signals.

5. The computer-implemented method of claim 1, further comprising:

updating the one or more allocation signals based on a function, wherein the function is based on a continuous probability distribution.

6. The computer-implemented method of claim 1, further comprising:

receiving a feedback signal based on the campaign-level rate-estimate signal; and controlling the campaign-level rate-estimate signal based on the feedback signal such that the controlled campaign-level rate-estimate signal is greater than or equal to the rate threshold.

7. The computer-implemented method of claim 6, wherein controlling the campaign-level rate-estimate signal includes employing a feedback based controller.

8. The computer-implemented method of claim 1, wherein the determining the one or more allocation signals is based on the equation:

$$a_i(\hat{p}_i, u) = \frac{1}{B(\alpha_c(u), \beta_c(u))} \int_0^{\hat{p}_i} t^{\alpha-1}(1-t)^{\beta-1} dt,$$

wherein $a_i$ corresponds to an updated bid allocation signal, $\hat{p}_i$ corresponds to a rate-estimate signal, u corresponds to the control signal, a corresponds to the first shape parameter, $\beta$ corresponds to the second shape parameter and c corresponds to the actuator configuration parameter.

9. One or more non-transitory computer-readable storage media having instructions embodied thereon which, when executed by one or more processors, cause the one or more processors to:

update a control signal to generate an updated control signal based on a difference between a feedback signal and a rate threshold that corresponds to a minimum event rate for an online campaign, wherein the feedback signal is generated in response to previous content provided in the online campaign that includes a plurality of segments;

update a plurality of allocation signals based on the updated control signal, wherein the plurality of allocation signals comprises:

(i) a first allocation signal, for a first campaign segment, indicative of a first probability of participating in bidding to provide subsequent content in the online campaign for the first campaign segment; and (ii) a second allocation signal, for a second campaign segment, indicative of a second probability of participating in bidding to provide the subsequent content in the online campaign for the second campaign segment, wherein the second probability is different than the first probability; and in response to updating the plurality of allocation signals, bid for the subsequent content in the online campaign such that an event rate associated with providing at least a portion of the subsequent content is greater than or equal to the minimum event rate for the online campaign, wherein the updating the plurality of allocation signals is based on a ratio of:

an incomplete beta function based upon (i) time, (ii) a first shape parameter and (iii) a second shape parameter; to a second beta function of (i) the first shape parameter, for an actuator configuration parameter, of the updated control signal and (ii) the second shape parameter, for the actuator configuration parameter, of the updated control signal.

10. The one or more computer-readable storage media of claim 9, wherein the instructions further cause the one or more processors to:

sample impression signals from an online market that hosts at least a portion of the online campaign;

update the feedback signal to generate an updated feedback signal based on the sampled impression signals; and provide the updated feedback signal for subsequent updates to the control signal.

11. The one or more computer-readable storage media of claim 9, wherein the instructions further cause the one or more processors to:
update the plurality of allocation signals based on a function, wherein the function further provides a continuous relationship between the control signal and each of the plurality of allocation signals.

12. The one or more computer-readable storage media of claim 11, wherein the function is a monotonically decreasing continuous function of the control signal such that for the continuous relationship between the control signal and each of the plurality of allocation signals, as the control signal is continuously increased, each of the plurality of allocation signals is continuously decreased.

13. The one or more computer-readable storage media of claim 9, wherein the instructions further cause the one or more processors to:
update the plurality of allocation signals based on a function, wherein the function is a monotonically increasing continuous function of each of a plurality of segment-level rate-estimate signals such that for the continuous relationship between each of the plurality of segment-level rate-estimate signals and the corresponding allocation signal, as each of the plurality of segment-level rate-estimate signals is continuously increased, the corresponding allocation signal is continuously increased.

14. The one or more computer-readable storage media of claim 9, wherein the rate threshold is a time-dependent signal.

15. The one or more computer-readable storage media of claim 9, wherein the instructions further cause the one or more processors to:
update the plurality of allocation signals based on a function, wherein the function is based on a continuous probability distribution.

16. A control system, comprising:
a rate controller;
a rate actuator;
a rate estimator;
one or more processors; and
memory, coupled with the one or more processors, having instructions stored thereon, which, when executed by the one or more processors cause the one or more processors to:
employ the rate controller to receive a rate threshold signal;
employ the rate controller to iteratively update a control signal based on the rate threshold signal and a campaign-level rate-estimate signal that corresponds to an event rate for previous content provided in an online campaign;
provide the control signal to the rate actuator; and
employ the rate actuator to iteratively update a plurality of allocation signals to generate iteratively updated allocation signals based on the control signal and at least one of one or more shape parameters or one or more configuration parameters, wherein the plurality of allocation signals comprises:
a first allocation signal, for a first campaign segment, indicative of a first probability of participating in bidding to provide subsequent content in the online campaign for the first campaign segment; and
a second allocation signal, for a second campaign segment, indicative of a second probability of participating in bidding to provide the subsequent content in the online campaign for the second campaign segment, wherein the second probability is different than the first probability,
wherein the updating the plurality of allocation signals is based on a ratio of:
an incomplete beta function based upon (i) time, (ii) a first shape parameter and (iii) a second shape parameter; to
a second beta function of (i) the first shape parameter, for an actuator configuration parameter, of the control signal and (ii) the second shape parameter, for the actuator configuration parameter, of the control signal.

17. The system of claim 16, wherein the instructions further cause the one or more processors to:
employ the rate estimator to iteratively sample the one or more impression signals from an online market that at least partially hosts the online campaign;
employ the rate estimator to iteratively update one or more marginal impression signals based on the sampled one or more impression signals; and
employ the rate estimator to iteratively update the campaign-level rate-estimate signal further based on the one or more marginal impression signals.

18. The system of claim 16 wherein the instructions further cause the one or more processors to:
initialize a state of the rate controller based on one or more controller configuration parameters; and
initialize a state of the rate estimator based on one or more estimator configuration parameters.

19. The system of claim 16, wherein iteratively updating the plurality of allocation signals is further based on a function that provides a continuous relationship between the control signal and each of the plurality of allocation signals.

20. The system of claim 19, wherein the function is a monotonically decreasing continuous function of the control signal such that for the continuous relationship between the control signal and each of the plurality of allocation signals, as the control signal is continuously increased, each of the plurality of allocation signals is continuously decreased.

* * * * *